(12) United States Patent
Lee

(10) Patent No.: US 11,429,113 B2
(45) Date of Patent: Aug. 30, 2022

(54) SERVING SYSTEM USING ROBOT AND OPERATION METHOD THEREOF

(71) Applicant: LG ELECTRONICS INC., Seoul (KR)

(72) Inventor: Dongeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 16/940,160

(22) Filed: Jul. 27, 2020

(65) Prior Publication Data
US 2021/0039255 A1    Feb. 11, 2021

Related U.S. Application Data

(63) Continuation-in-part of application No. 16/570,991, filed on Sep. 13, 2019, now Pat. No. 11,185,982.

(30) Foreign Application Priority Data

Aug. 8, 2019   (KR) .................. 10-2019-0096745
Dec. 23, 2019   (KR) .................. 10-2019-0173324

(51) Int. Cl.
    *G05D 1/02*   (2020.01)
    *B25J 9/16*   (2006.01)

(52) U.S. Cl.
    CPC .......... *G05D 1/0276* (2013.01); *B25J 9/1666* (2013.01); *B25J 9/1697* (2013.01)

(58) Field of Classification Search
    CPC .... G06Q 50/12; G05D 1/0268; G05D 1/0274; G05D 1/0276; G05D 1/0212; G05D 2201/0206
    See application file for complete search history.

(56) References Cited

U.S. PATENT DOCUMENTS

| 10,070,265 | B1* | 9/2018 | Maricic | ............... H04W 4/33 |
| 10,229,501 | B2* | 3/2019 | Kim | .................. G06T 7/74 |
| 2003/0156493 | A1* | 8/2003 | Bayer | ............. G05D 1/0261 |
| | | | | 367/6 |
| 2013/0097038 | A1* | 4/2013 | Potter | .............. G06Q 20/384 |
| | | | | 705/21 |

(Continued)

FOREIGN PATENT DOCUMENTS

| KR | 20170061355 | 6/2017 |
| KR | 20170138977 | 12/2017 |

OTHER PUBLICATIONS

United States Patent and Trademark Office U.S. Appl. No. 16/570,991, Office Action dated Jun. 9, 2021, 12 pages.

*Primary Examiner* — Ryan Rink
(74) *Attorney, Agent, or Firm* — Lee Hong Degerman Kang & Waimey

(57) ABSTRACT

A serving system using a robot may include a caller mounted on each of a plurality of tables, and a robot driving to a target table among the plurality of tables based on information received from the caller, and the robot may store information on the location of each of the plurality of callers, the size and shape of each of the plurality of tables, the location of the caller mounted on the table, and the rotational angle with respect to a baseline of the caller, and the caller may transmit to the robot information on the distance from the caller to the robot and the direction of the robot with respect to the caller during driving of the robot.

15 Claims, 18 Drawing Sheets

(56) References Cited

U.S. PATENT DOCUMENTS

| | | | |
|---|---|---|---|
| 2016/0026705 A1* | 1/2016 | Pesonen | H04W 4/029 |
| | | | 707/737 |
| 2016/0217578 A1* | 7/2016 | Can | G01C 19/5698 |
| 2017/0108872 A1* | 4/2017 | Mannefred | G05D 1/028 |
| 2017/0364074 A1* | 12/2017 | Lau | G06Q 50/28 |
| 2018/0136615 A1* | 5/2018 | Kim | G06N 20/10 |
| 2018/0202813 A1* | 7/2018 | Belt | H04W 4/024 |
| 2018/0333862 A1* | 11/2018 | Hayashi | A63H 13/005 |
| 2018/0370728 A1* | 12/2018 | Gallagher | B25J 5/007 |
| 2019/0066485 A1* | 2/2019 | Roberts | H04W 4/021 |
| 2019/0113934 A1* | 4/2019 | Bjorkengren | B62D 15/0285 |
| 2019/0270204 A1* | 9/2019 | Kawamura | B25J 11/008 |
| 2019/0272580 A1* | 9/2019 | Kawamura | H04N 5/23299 |
| 2019/0275676 A1* | 9/2019 | Jensen | B25J 9/1689 |
| 2019/0388781 A1* | 12/2019 | Taylor | A63F 13/5375 |
| 2020/0047337 A1* | 2/2020 | Williams | B25J 9/163 |
| 2020/0050995 A1* | 2/2020 | Ramanand | G06Q 10/1097 |
| 2020/0238523 A1* | 7/2020 | Ha | B25J 9/1653 |
| 2020/0246971 A1* | 8/2020 | Johnson | B66F 9/063 |
| 2020/0249660 A1* | 8/2020 | Rao | G05B 19/0428 |
| 2020/0290208 A1* | 9/2020 | Ha | G06Q 50/12 |
| 2020/0366815 A1* | 11/2020 | Hasunuma | G06T 7/579 |
| 2020/0398437 A1* | 12/2020 | Hao | B25J 5/00 |
| 2021/0039255 A1* | 2/2021 | Lee | B25J 9/1666 |
| 2021/0147202 A1* | 5/2021 | Black | B66F 9/063 |

* cited by examiner

▸ : CALLING SIGNAL

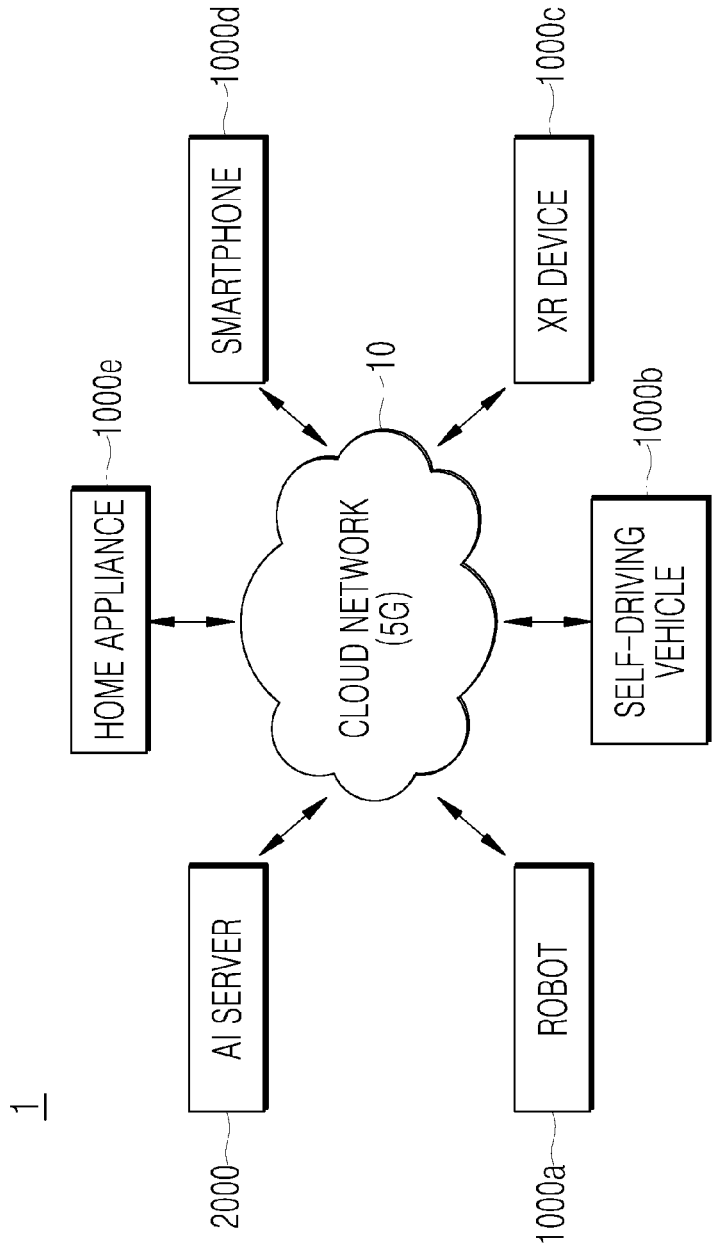

SERVING SYSTEM USING ROBOT AND OPERATION METHOD THEREOF

CROSS-REFERENCE TO RELATED APPLICATION

This is a continuation-in-part of U.S. patent application Ser. No. 16/570,991, filed on Sep. 13, 2019, now U.S. Pat. No. 11,185,982, which claims the benefit of earlier filing date and right of priority to Korean Patent Application Nos. 10-2019-0096745, filed on Aug. 8, 2019, and 10-2019-0173324, filed on Dec. 23, 2019, the contents of which are hereby incorporated by reference herein in its entireties.

BACKGROUND

1. Technical Field

The embodiment relates to a serving system using a robot and an operation method thereof, and more particularly, to a serving system using a robot and an operation method thereof, which have enhanced autonomous driving performance.

2. Description of Related Art

The content described in this section simply provides background information on the embodiments and does not constitute the related art.

The provision of service using a robot is spreading. In the service required for a customer in a restaurant, for example, ordering food, delivering the ordered food to the customer, etc., research is actively being conducted on the robot providing the service on behalf of a human employee.

In order for the robot to provide this service, the robot should be able to conduct an autonomous driving to a table with the calling customer. Accordingly, the autonomous driving may be required for a service robot used in a restaurant.

Meanwhile, in order for the robot to conduct the autonomous driving, the robot should confirm its current location while driving, and needs to recognize the features around its driving route.

For this purpose, the robot needs to perform Simultaneous Localization And Mapping (SLAM).

In general, in order for an autonomous driving robot to perform the SLAM, the robot confirms the surrounding features by using a sensing means such as a Light Detection And Ranging (LiDAR) apparatus provided by the robot, and performs the SLAM based on the confirmed result.

However, this typical SLAM process may require excessive operation and data processing by the robot, and require apparatuses such as many sensing means for accurate results. This causes inefficiency.

Accordingly, in order to perform a simple, fast, and accurate SLAM, it is necessary to consider a method for providing a sensing means in another apparatus outside the autonomous driving robot and performing the SLAM by using this sensing means.

Korean Patent Laid-Open Publication No. 10-2017-0061355 discloses a configuration of tracking the location of a mobile robot by analyzing an image captured from a camera, and increasing the accuracy of SLAM.

Korean Patent Laid-Open Publication No. 10-2017-0138977 discloses a configuration of applying odometry information obtained in a moving process of a walking robot to an image-based SLAM technology.

However, these documents do not disclose a method for providing the sensing means in another apparatus outside the autonomous driving robot, and performing the SLAM by using the sensing means.

SUMMARY OF THE DISCLOSURE

An aspect of an embodiment is to provide a serving system using a robot and an operation method thereof, which have a configuration of providing a sensing means in another apparatus outside an autonomous driving robot, and performing a SLAM by using the sensing means.

Another aspect of an embodiment is to provide a method for confirming information on the distance from a plurality of sensing means provided outside a robot to the robot and the direction of the robot, and performing, by the robot, a SLAM based on the information.

Still another aspect of an embodiment is to provide a method for forming a map and a driving route for autonomous driving of a robot by using a plurality of sensing means provided outside the robot.

The objectives to implement in the embodiments are not limited to the technical objectives described above, and other objectives that are not stated herein will be clearly understood by those skilled in the art from the following specifications.

For achieving the objects, a serving system using a robot may include a caller mounted on each of a plurality of tables, and a robot driving to a target table among the plurality of tables based on information received from the caller.

The robot may store information on the location of each of the plurality of callers, the size and shape of each of the plurality of tables, the location of the caller mounted on the table, and the rotational angle with respect to a baseline of the caller.

The caller may transmit to the robot information on the distance from the caller to the robot and the direction of the robot with respect to the caller during driving of the robot.

The caller may include a bell switch for calling the robot, a positioning sensor for sensing the distance to the robot and the direction of the robot, and sensing the distance to each of the callers and the direction of each of the callers, a magnetic sensor for sensing whether a table with the caller rotates and the rotational angle thereof, and a communicator connected with the bell switch, the positioning sensor, and the magnetic sensor, and for communicating with the robot.

The positioning sensor may be provided as an Ultra Wide Band (UWB) sensor.

The robot may generate a map including the arrangement state of each of the tables from the stored information.

The robot may generate the driving route for going to the caller based on the generated map, when receiving a calling signal from the caller.

The robot may generate the map by combining the coordinates of the caller, the size and shape of the table, and the rotational angle with respect to the baseline of the caller, which are derived from the stored information.

The robot may confirm its current location based on information on the distance from the caller to the robot and the direction of the robot with respect to the caller during driving.

The caller may transmit to the robot information on the location of an obstacle appearing on the driving route of the robot.

The caller may transmit to the robot information on the distance from the caller to the obstacle and the direction of the obstacle with respect to the caller.

The robot may confirm the changed arrangement of the table by receiving information on at least one of a change in the location of the caller or the rotational angle with respect to the baseline from the caller.

The robot may store information on the changed arrangement of the table.

The robot may include an inputter, and the robot may set a target table among the plurality of tables and generate a driving route according to the content input to the inputter or a call of the caller.

A method for operating a serving system using a robot may include setting, by a robot, a target table among a plurality of tables, generating, by the robot, a map for driving based on the stored information, generating, by the robot, a driving route on the map, driving, by the robot, along the generated driving route, and confirming, by the robot, its current location based on information received from a caller provided on the plurality of tables, respectively, during driving.

The robot may store information on the location of each of the plurality of callers, the size and shape of each of the plurality of tables, the location of the caller mounted on the table, and the rotational angle with respect to a baseline of the caller.

The caller may transmit to the robot information on the distance from the caller to the robot and the direction of the robot with respect to the caller during driving of the robot.

The robot may confirm the changed arrangement of the table by receiving information on at least one of a change in the location of the caller or the rotational angle with respect to the baseline from the caller, and store the information on the changed arrangement of the table.

The caller may transmit to the robot information on the distance from the caller to an obstacle appearing on the driving route of the robot and the direction of the obstacle with respect to the caller, and the robot may store the information on the obstacle received from the caller.

Unlike the general autonomous driving method in which the driving robot performs the SLAM by itself, in an embodiment, the callers which are provided in plural and located at locations different from each other, respectively may confirm the features around the robot and confirm the location of the robot.

According to this structure, it is possible for the robot to reduce the operation and data processing time, and the occurrence of the overload caused by the above, compared to the case of performing the SLAM alone, thereby significantly reducing the operation error during the autonomous driving of the robot caused by the above.

In an embodiment, it is possible to sense the location by using the UWB sensor, thereby performing the SLAM for autonomous driving of the robot at low cost without harming the human body.

In addition, it is possible for each UWB sensor to confirm the information on the locations of the robot and other UWB sensors by using the plurality of UWB sensors, thereby performing a very accurate SLAM.

BRIEF DESCRIPTION OF THE DRAWINGS

FIG. 19 is a diagram illustrating an AI system 1 according to an embodiment.

DETAILED DESCRIPTION

Hereinafter, the embodiments will be described in detail with reference to the accompanying drawings.

Advantages and features of the present disclosure and methods for achieving them will become apparent from the descriptions of aspects herein below with reference to the accompanying drawings.

However, the present disclosure is not limited to the aspects disclosed herein but may be implemented in various different forms. The aspects are provided to make the description of the present disclosure thorough and to fully convey the scope of the present disclosure to those skilled in the art.

It is to be noted that the scope of the present disclosure is defined only by claims. Although the terms first, second, third, etc. may be used herein to describe various elements, components, regions, layers and/or sections, these elements, components, regions, layers and/or sections should not be limited by these terms.

Terms such as "first," "second," and other numerical terms when used herein do not imply a sequence or order unless clearly indicated by the context. These terms are generally only used to distinguish one element from another. Thus, a first element, component, region, layer or section discussed below could be termed a second element, component, region, layer or section without departing from the teachings of the example embodiments.

In the following description, when an element is described as being formed "on (over)" or "beneath (under)" another element, the element includes two elements that are in direct contact with each other, or one or more other elements located indirectly between the two elements. Terms formed "on (over)" or "beneath (under)" may denote not only the upward direction from one element but the downward direction.

The relational terms used in the following description such as "on/upper/over" and "beneath/lower/under" may be used to discriminate any one subject or component from another subject or component without necessarily requiring or including any physical or logical relationship of corresponding subjects or components.

Figure 1:
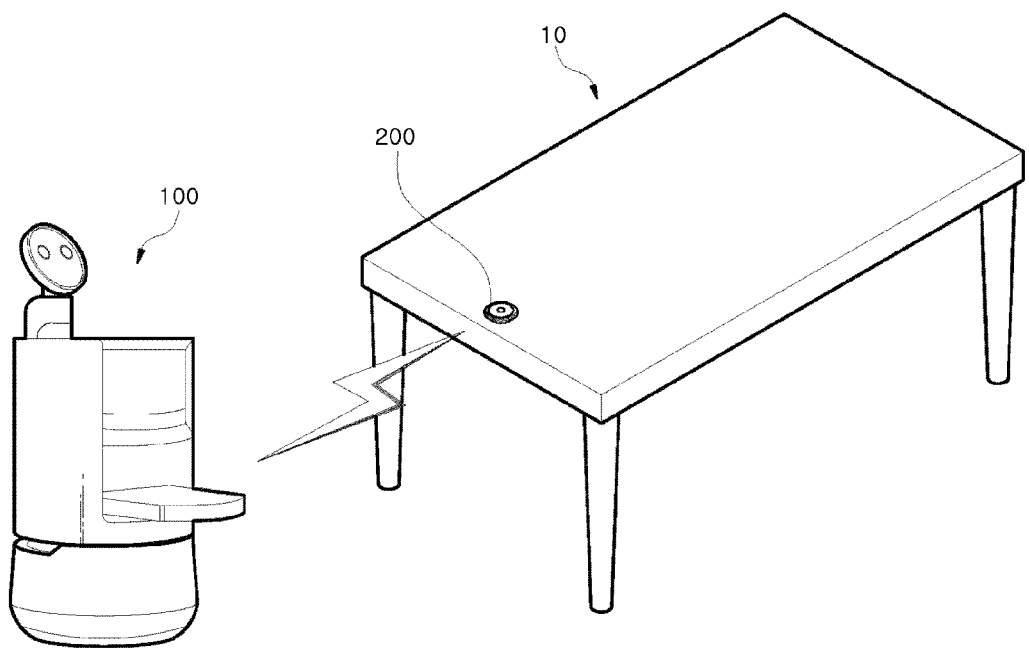
FIG. 1 is a diagram for explaining a serving system using a robot according to an embodiment.

FIG. 1 is a diagram for explaining a serving system using a robot according to an embodiment.

A robot may mean a machine for automatically handling or operating a given task by its own ability. In particular, a robot having a function of recognizing the environment, and determining by itself to perform an operation may be referred to as an intelligent robot.

The robot may be classified into an industrial use, a medical use, a household use, a military use, etc. according to the purpose or field of use.

The robot may include a driving unit including an actuator or a motor to perform various physical operations such as moving a robot joint. In addition, the movable robot may include a wheel, a brake, a propeller, etc. in the driving unit to drive on the ground or fly in the air through the driving unit.

In an embodiment, a robot 100 may be, for example, a robot 100 located in a restaurant, etc. to serve for the convenience of a customer. In an embodiment, the present disclosure may relate to a serving system using the serving robot 100.

The serving robot 100 of the embodiment may be used in a home and other various places in addition to the restaurant, but for clarity, the robot 100 used in the restaurant will be described in detail below.

The robot 100 is capable of autonomous driving, and may include a communication apparatus to communicate with a caller 200 mounted on a table 10 provided in the restaurant. In case that the caller is solely configured, it is indicated as a calling device. In addition, the robot 100 may wirelessly communicate with a server to receive various information from the server, and update this information.

The autonomous driving means a technology of driving by itself, and an autonomous driving vehicle means a vehicle for driving without a user's operation or with minimal operation of the user.

For example, the autonomous driving may include all of a technology of maintaining a driving lane, a technology of automatically adjusting a speed such as an adaptive cruise control, a technology of automatically driving along a predetermined route, a technology of automatically setting the route when a target is set and driving, etc.

The vehicle includes all of a vehicle having only an internal combustion engine, a hybrid vehicle having the internal combustion engine and an electric motor together, and an electric vehicle having only the electric motor, and may include not only the vehicle but also a train, a motorcycle, etc.

At this time, the autonomous driving vehicle may be regarded as the robot 100 having an autonomous driving function.

An embodiment may relate to extended reality. The extended reality collectively refers to Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

The robot 100 may drive to each table 10 to provide food to a customer, or provide any convenience for meal to the customer, such as ordering of the customer or guiding the customer.

For example, the robot 100 may communicate with the caller 200 by using a short-range communication means such as Wi-Fi or Bluetooth, and may be connected to the server by wire.

In another embodiment, the robot 100 may be configured to include at least one of a mobile communication module and a wireless internet module for communication with the caller 200 or the server. In addition, the robot 100 may further include a short-range communication module.

The mobile communication module may transmit and receive a wireless signal with at least one of a base station, an external terminal, and a server on a mobile communication network according to the technology standards or the communication method for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G mobile communication, etc.).

The wireless Internet module, as a module for wireless Internet access, may be mounted in or outside the robot 100. The wireless Internet module may transmit and receive the wireless signal in a communication network in accordance with wireless Internet technologies.

The robot 100 may transmit and receive data to and from the server and the terminal capable of performing various communications through a 5G network. In particular, the robot 100 may perform data communications with the server and the terminal by using at least one network service among enhanced mobile broadband (eMBB), ultra-reliable and low latency communications (URLLC), and massive machine-type communications (mMTC).

The eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the large-volume traffic may be accommodated in an area where user mobility is low and user density is high. Through broadband coverage, a wide-range and stable wireless environment and user mobility may be guaranteed.

The URLLC service defines the requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. A much larger number of terminals, such as sensors, than a general portable phone may be connected to a wireless access network by mMTC at the same time. The communication module of the terminal 300 should be inexpensive, and there is a need for improved power efficiency and power saving technology capable of operating for years without battery replacement or recharging.

An artificial intelligence technology may be applied to the robot 100. Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The caller 200 may be mounted on each of a plurality of tables 10, and a customer occupying the table 10 may call the robot 100 by pressing a bell switch 210 of the caller 200.

The robot 100 may receive a calling signal from the caller 200. The robot 100 may drive to a target table 10 of the plurality of tables 10 based on the information received from the caller 200. For example, when receiving a call, the robot 100 may target the table 10 in which the caller 200 is located, and go to the target table 10 by autonomous driving.

The robot 100 may hold a map necessary for autonomous driving, and generate a driving route for going to the target table 10 from the current location by using the map.

In order for the robot 100 to go to the target table 10 along the driving route, the robot 100 needs to always confirm its current location during driving, and may perform the task for generating the map by confirming the surrounding features in order to confirm the current location.

That is, for the autonomous driving, the robot 100 may simultaneously perform the map generation for its own location estimation and autonomous driving. That is, the robot 100 may perform a Simultaneous Localization and Mapping (SLAM). Since the SLAM itself is well known as the known technology, the description of the specific technical content will be omitted.

The robot 100 may update the map previously stored with a map newly generated by SLAM. According to the map update using the SLAM, the robot 100 may effectively cope with the occurrence of a new obstacle 30-1 on the driving route, a change in the driving route, etc.

In the autonomous driving field, the robot 100 generally performs the SLAM by a method for generating a map by confirming the surrounding situation at the current location during driving, and confirming its current location on the generated map.

Typically, the performing the SLAM confirms the surrounding features by using a sensing means such as a Light Detection And Ranging (LiDAR) apparatus included in the robot 100, and performs the SLAM based on the confirmed result.

However, this typical SLAM process may require excessive operation and data processing by the robot 100, and require apparatuses such as many sensing means for accurate results. This causes inefficiency.

In addition, in order to avoid excessive operation and data processing of the robot 100, when the SLAM is performed in a separate server for communicating with the robot 100, delay of the operation and data processing and a malfunction of the robot 100 may be caused, such that this also causes inefficiency.

Accordingly, an embodiment provides a serving system capable of SLAM effectively by using the caller 200 as a sensing means when the robot 100 capable of communicating with the caller 200 performs the SLAM.

The robot 100 may store the information on the location of each of the plurality of callers 200, the size and shape of each of the plurality of tables 10, the location of the caller 200 mounted on the table 10, and the rotational angle with respect to the baseline of the caller 200.

The location of each of the callers 200 may be transmitted from the respective callers 200 to the robot 100. That is, the caller 200 may transmit to the robot 100 the information on the distance to the robot 100 and the direction of the robot 100 confirmed based on itself, and the robot 100 may confirm the location of the caller 200 therefrom.

The information on the size and shape of each of the tables 10 may be input to the robot 100 by the user, and if there is a change in the size and shape of the table 10, the user may update it to the robot 100.

Likewise, the location of the caller 200 mounted on the table 10 may also be input to the robot 100 by the user, and if there is a change therefor, the user may update it to the robot 100.

The information on the rotational angle with respect to the baseline of the caller 200 may be confirmed by the caller 200, and the caller 200 may transmit the confirmed information to the robot 100. The change in the rotational angle may mean that the arrangement of the table 10 in the restaurant is changed by rotating the table 10.

The robot 100 may update the map for setting the driving route by confirming the information on the rotational angle to confirm the change in the location of the table 10 in the restaurant. This will be described in detail below.

The caller 200 may transmit to the robot 100 the information on the distance from the caller 200 to the robot 100 and the direction of the robot 100 with respect to the caller 200 upon driving of the robot 100.

That is, the plurality of callers 200 may transmit to the robot 100 the information by which the robot 100 may confirm its current location during driving of the robot 100, and the robot 100 may confirm its current location on the map generated for driving based on the received information.

In addition, the caller 200 may confirm the features around the current location of the robot 100, transmit the confirmed result to the robot 100, and the robot 100 may update the existing map by generating a map in real time based on the received result. This will be described later in detail.

Unlike the general autonomous driving method in which the driving robot 100 performs a SLAM by itself, in an embodiment, the callers 200, which are provided in plural and located at locations different from each other, respectively, may confirm the features around the robot 100 and confirm the location of the robot 100.

According to this structure, it is possible for the robot 100 to reduce the operation and data processing time and the occurrence of overload caused by the above, compared to the case of performing the SLAM alone, thereby significantly reducing the operation error during the autonomous driving of the robot 100 caused by the above.

Figure 2:
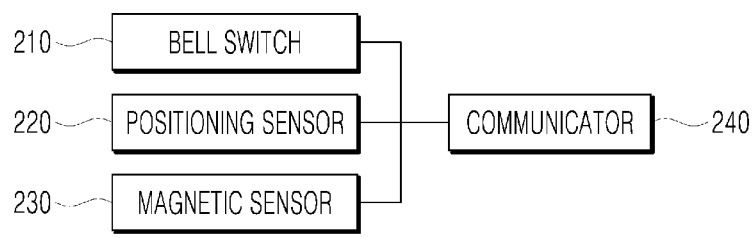
FIG. 2 is a diagram for explaining a caller according to an embodiment.
Figure 3:
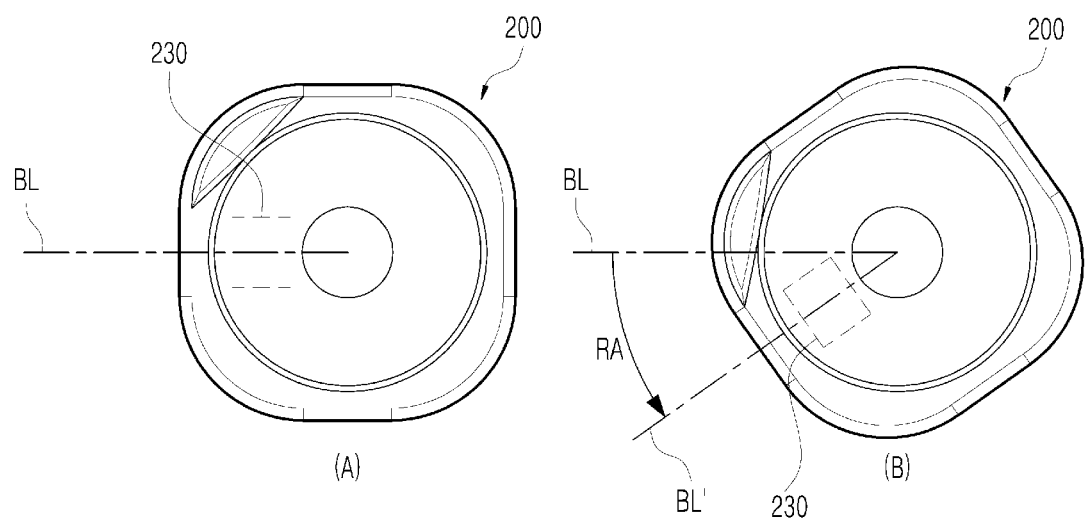
FIG. 3 is a diagram for explaining an operation of a magnetic sensor provided in the caller according to an embodiment.

FIG. 2 is a diagram for explaining a caller 200 according to an embodiment. FIG. 3 is a diagram for explaining an operation of a magnetic sensor 230 provided in the caller 200 according to an embodiment. The caller 200 may include a bell switch 210, a positioning sensor 220, a magnetic sensor 230, and a communicator 240.

The communicator 240 may be connected with the bell switch 210, the positioning sensor 220, and the magnetic sensor 230, and provided for communication with the robot 100. The caller 200 may transmit and receive necessary information and data with the robot 100 through the communicator 240.

The bell switch 210 may call the robot 100. A customer may call the robot 100 by pressing the bell switch 210, and the robot 100 may receive an alarm generated when the bell switch 210 is pressed to specify the caller 200 called by the customer, and perform autonomous driving to go to the table 10 on which the specified caller 200 has been mounted.

The positioning sensor 220 may sense the distance to the robot 100 and the direction of the robot 100 with respect to the caller 200. In addition, the positioning sensor 220 may sense the distance to each of the other callers 200 and the direction of each of the callers 200 with respect to its own.

The positioning sensor 220 may transmit a signal, and confirm the distance to the sensed object and the direction in which the sensed object is located by calculating the time until the signal returns.

For example, if the robot 100 and the two positioning sensors 220 are present, one positioning sensor 220 may confirm the distance and direction for the robot 100 and the other positioning sensor 220, and the latter other positioning sensor 220 may also confirm the distance and direction for the robot 100 and the former positioning sensor 220.

Based on the information on the distance and the direction, for example, through the triangulation, it is possible to confirm the locations of the robot 100 and the two positioning sensors 220. Accordingly, one positioning sensor 220 may confirm the distance and direction of the other positioning sensors 220 and the robot 100.

The robot 100 may receive the information on the distance and direction confirmed from all positioning sensors 220, and confirm the locations of all positioning sensors 220 based on the received information.

For example, the positioning sensor 220 may be provided as a UWB sensor. The UWB sensor may transmit a broadband wireless signal, and confirm the distance to the object and the direction of the object by calculating the time when the transmitted wireless signal hits the object and returns.

Compared to a LiDAR sensor, the UWB sensor is simpler to configure, less expensive, and has less impact on the human body. Accordingly, it is possible to sense the location by using the UWB sensor in a restaurant with many customers, thereby performing the SLAM for autonomous driving of the robot 100 at low cost without harming the human body.

In addition, it is possible for each UWB sensor to confirm the information on the locations of the robot 100 and other UWB sensors by using the plurality of UWB sensors, thereby performing a very accurate SLAM.

The magnetic sensor 230 may sense whether a table with the caller 200 rotates and the rotational angle thereof by sensing whether the magnetic sensor 230 rotates and the rotational angle thereof. The magnetic sensor 230 may sense whether the magnetic sensor 230 rotates and the rotational angle thereof by confirming a slight change in the direction and magnitude of the earth magnetic field generated when the magnetic sensor 230 rotates.

Referring to FIG. 3, when the caller 200 rotates to become a state (B) from a state (A), the rotational angle formed by a line BL' rotated from a baseline and the baseline BL becomes RA counterclockwise from the baseline BL.

The magnetic sensor 230 provided in the caller 200 may confirm the rotational angle RA by confirming a change in the direction and magnitude of the earth magnetic field by rotating together when the caller 200 rotates.

The caller 200 may confirm the rotational angle through the magnetic sensor 230, accordingly, confirm the rotational angle of the table 10 on which the caller 200 has been mounted, and transmit the information on the rotational angle of the table 10 to the robot 100.

The robot 100 may perform the update reflecting such a change to the map for autonomous driving when the location of the table 10 is changed, based on the information on the rotational angle received from the caller 200, and the change in the location of the caller 200 also received from the caller 200. This will be described below in detail with reference to FIG. 6, etc.

FIGS. 4 to 6 are diagrams for explaining an operation of the serving system using the robot 100 according to an embodiment. First, a process of generating a map for autonomous driving of the robot 100 will be described with reference to FIGS. 4 and 5.

Figure 4A:
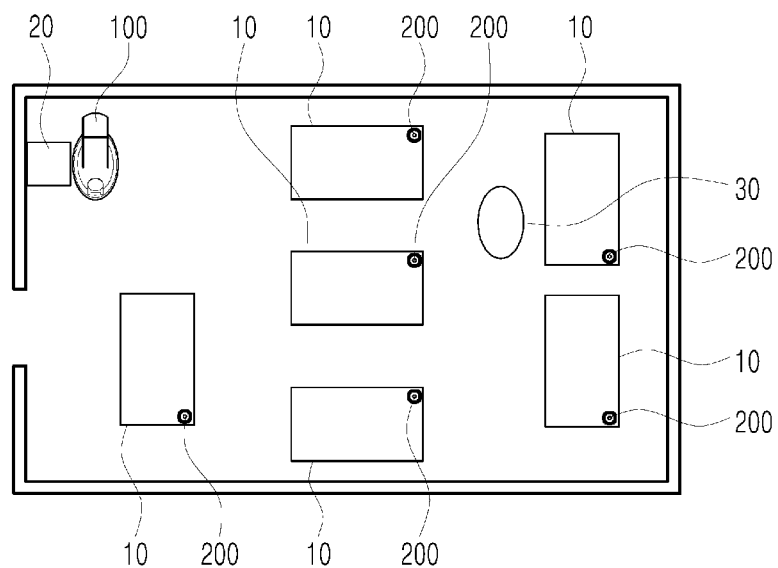
FIGS. 4A to 6C are diagrams for explaining an operation of the serving system using the robot according to an embodiment.

FIG. 4A illustrates an example in which the plurality of tables 10 and the caller 200 are located in a restaurant. The restaurant may be prepared with a charging apparatus 20 for charging the robot 100, and the robot 100 may wait in a location close to the charging apparatus 20.

The robot 100 may generate a map including the arrangement state of each table 10 from the stored information. At this time, as described above, the stored information may be information on the location of each of the plurality of caller 200, the size and shape of each of the plurality of tables 10, the position of the caller 200 mounted on the table 10, and the rotational angle with respect to the baseline of the caller 200.

The robot 100 may generate the map by combining the coordinates of the caller 200 derived from the stored information, the size and shape of the table 10, and the rotational angle with respect to the baseline of the caller 200.

Figure 4B:
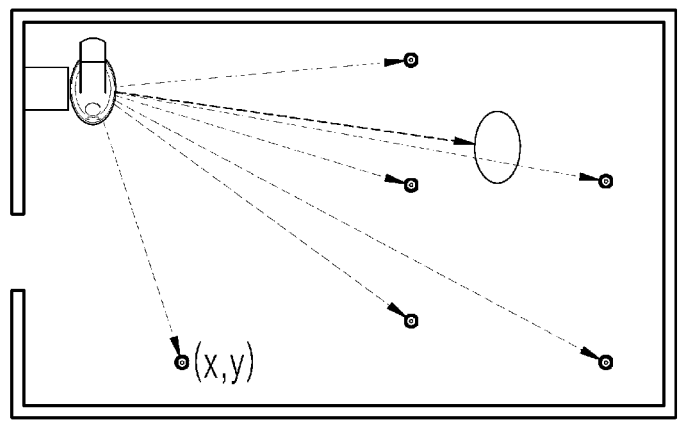

That is, the robot 100 may confirm the location of the table 10 based on the information. Referring to FIG. 4B, for example, the coordinates of the charging apparatus 20 may be represented as (0, 0), and the coordinates of each caller 200 may be represented as (x, y). The robot 100 may draw the location of each table 10 with the information on the size and shape of the table 10 stored in the coordinates of the caller 200, the location of the caller 200 mounted on the table 10, and the rotational angle with respect to the baseline of the caller 200. The map created in this method is illustrated in FIG. 4C.

Referring again to FIG. 4B, the caller 200 may confirm information on the location of an obstacle 30 in a restaurant capable of disturbing the driving of the robot 100, and transmit the confirmed information to the robot 100.

The confirming the location of the obstacle 30 may be similar to the above-described method for confirming the location of the table 10. The caller 200 may confirm the distance to the obstacle 30 and the direction of the obstacle 30 with respect to the positioning sensor 220.

Figure 4C:
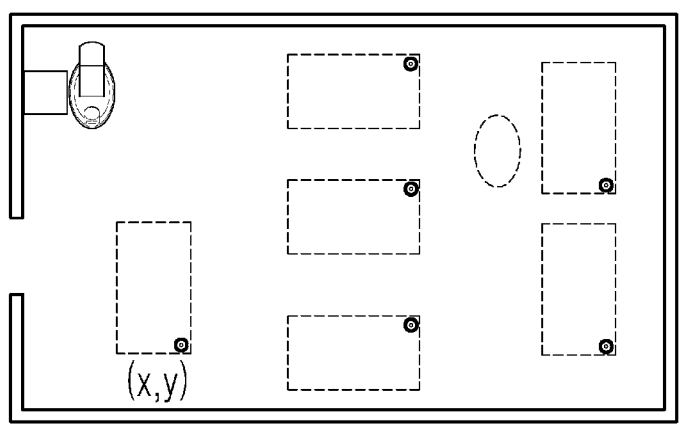

From the distance to the obstacle 30 and the direction information of the obstacle 30 confirmed by at least two callers 200, the robot 100 may confirm the location of the obstacle 30 by a triangulation method, represent the location of the obstacle 30 as coordinates, and as illustrated in FIG. 4C, display the obstacle 30 on the map.

Hereinafter, a method in which the robot 100 generates a driving route, and drives along the driving route will be described with reference to FIG. 5.

Figure 5A:
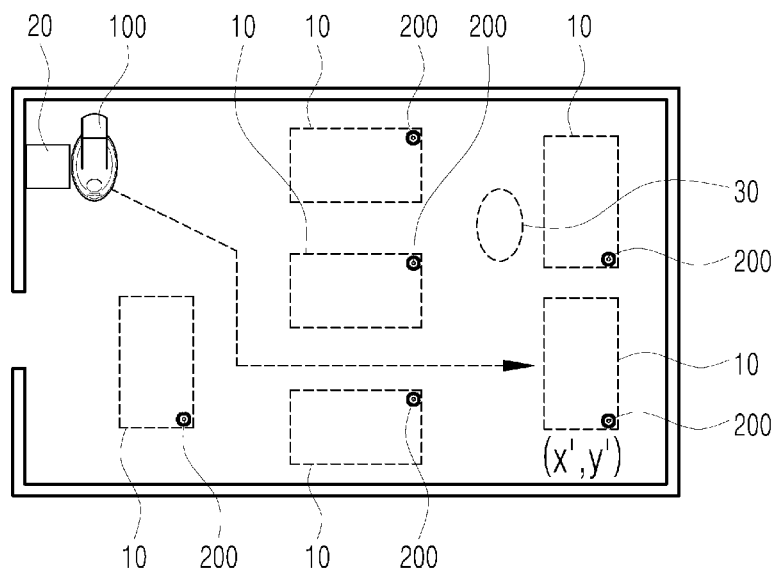
Figure 5B:
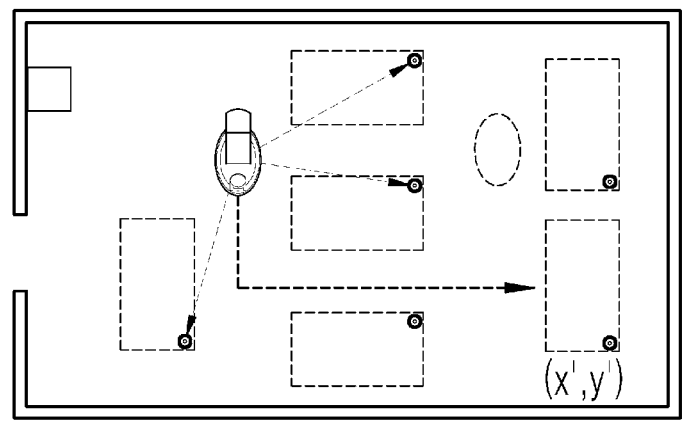

FIG. 5A illustrates a state where the robot 100 has generated the driving route on the map. FIG. 5B illustrates a state where the robot 100 drives along the generated driving route. When receiving the call signal from the caller 200, the robot 100 may generate the driving route for going to the caller 200 from which the robot 100 received the call signal based on the generated map.

As illustrated in FIG. 5A, for example, when receiving a call from the caller 200 located at (x', y'), the robot 100 may generate the driving route capable of avoiding the obstacle 30 and going to the table 10 from which the robot 100 received the call based on the generated map according to the information already held. The generated driving route is illustrated by an arrow in FIG. 5A.

The robot 100 may confirm its current location based on the information on the distance from the caller 200 to the robot 100 and the direction of the robot 100 with respect to the caller 200 when driving.

Referring to FIG. 5B, the robot 100 drives along the driving route. At this time, the caller 200 located in each table 10 may confirm the information on the distance to the driving robot 100 and the direction of the robot 100 with respect to its own, and transmit the confirmed information to the robot 100.

The robot 100 may confirm its current location in real time, for example, through triangulation, based on the information received from the plurality of callers 200. Meanwhile, in the same method, the caller 200 may transmit information on the locations of the obstacle 30 and other features appearing around the robot 100 at the current location of the driving robot 100 to the robot 100 or located around a table, and the robot 100 may confirm the information on the features therefrom.

Figure 5C:
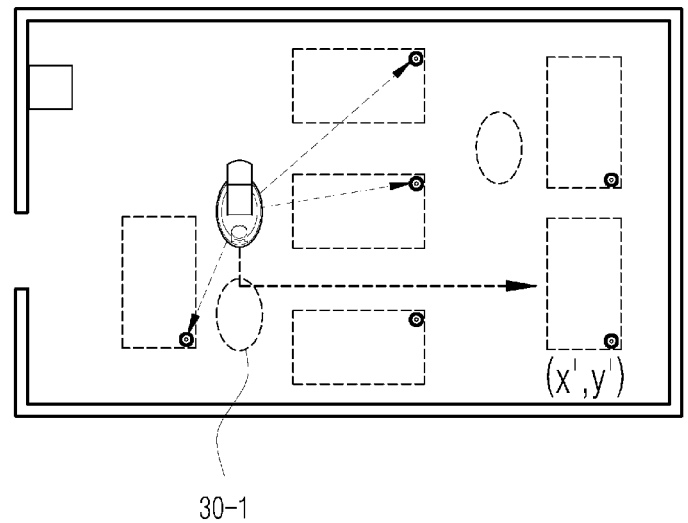

FIG. 5C illustrates a case where a new obstacle 30-1 appears during driving of the robot 100. Referring to FIG. 5C, the new obstacle 30-1 may appear on the driving route of the robot 100. At this time, the caller 200 may transmit to the robot 100 information on the location of the new obstacle 30-1 appearing on the driving route of the robot 100.

That is, the caller 200 may transmit information on the distance from the caller 200 to the obstacle 30 and the direction of the new obstacle 30-1 with respect to the caller 200 to the robot 100.

The robot 100 may reflect it to the driving by recognizing the location of the new obstacle 30-1 from the received information. If the new obstacle 30-1 blocks the existing driving route, the robot 100 may set a new driving route that avoids the new obstacle 30-1.

The robot 100 may update the map for autonomous driving by adding the information on the location of the new obstacle 30-1 to the previously generated map.

The robot 100 may perform the SLAM by confirming the current location during driving and the features on the driving route in the method described above.

Hereinafter, a process of correcting the map for autonomous driving will be described with reference to FIG. 6.

Figure 6A:
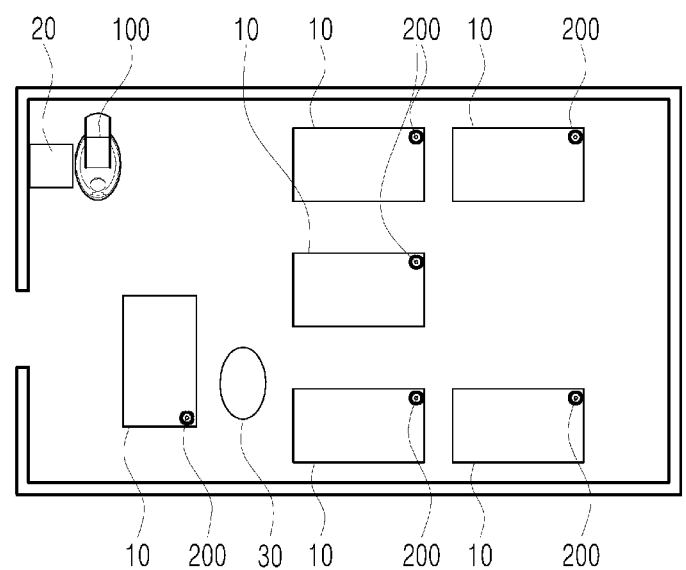

FIG. 6A illustrates an example in which the plurality of tables 10 and the caller 200 have been arranged in a restaurant, and the locations of the obstacle 30 and some tables 10 are changed compared to FIG. 4A.

Each caller 200 may confirm information on a change in the location of itself or another caller 200, and the rotational angle with respect to the baseline. The change in the location of the caller 200 may be confirmed by the positioning sensor 220, and the rotational angle may be confirmed by the magnetic sensor 230, respectively.

The robot 100 may confirm the changed arrangement of the table 10 by receiving information on at least one of the change in the location of the caller 200 or the rotational angle with respect to the baseline from the caller 200.

Figure 6B:
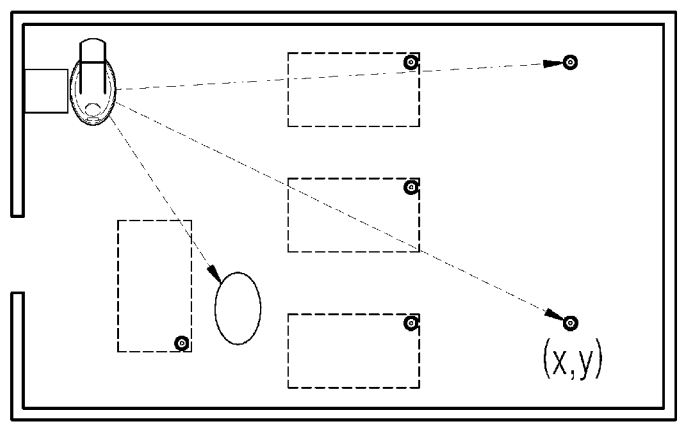

Referring to FIG. 6B, the robot 100 may confirm the location of the caller 200 at the changed (x, y) point based on the information received from the plurality of callers 200, for example, by triangulation.

Since the robot 100 already knows the location of the caller 200 in the table 10, the robot 100 may confirm the changed location of the table 10 by combining the location of the caller 200 in the table 10, and the changed location and rotational angle of the caller 200.

In addition, each caller 200 may also confirm information on a change in the location of the obstacle 30 by the positioning sensor 220. The robot 100 may receive the information on the changed location of the obstacle 30 from the plurality of callers 200, and confirm the changed location of the obstacle 30 based on the received information, for example, by triangulation.

Figure 6C:
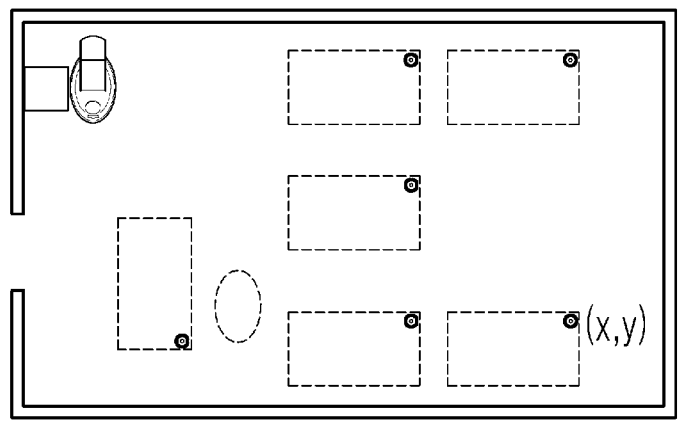

The map corrected in the above-described method has been illustrated in FIG. 6C. The robot 100 may store the information on the changed arrangement of the table 10, and the information on the changed location of the obstacle 30.

Based on the updated information, the robot 100 may update the map for autonomous driving, and generate a driving route based on the updated map.

Figure 8:
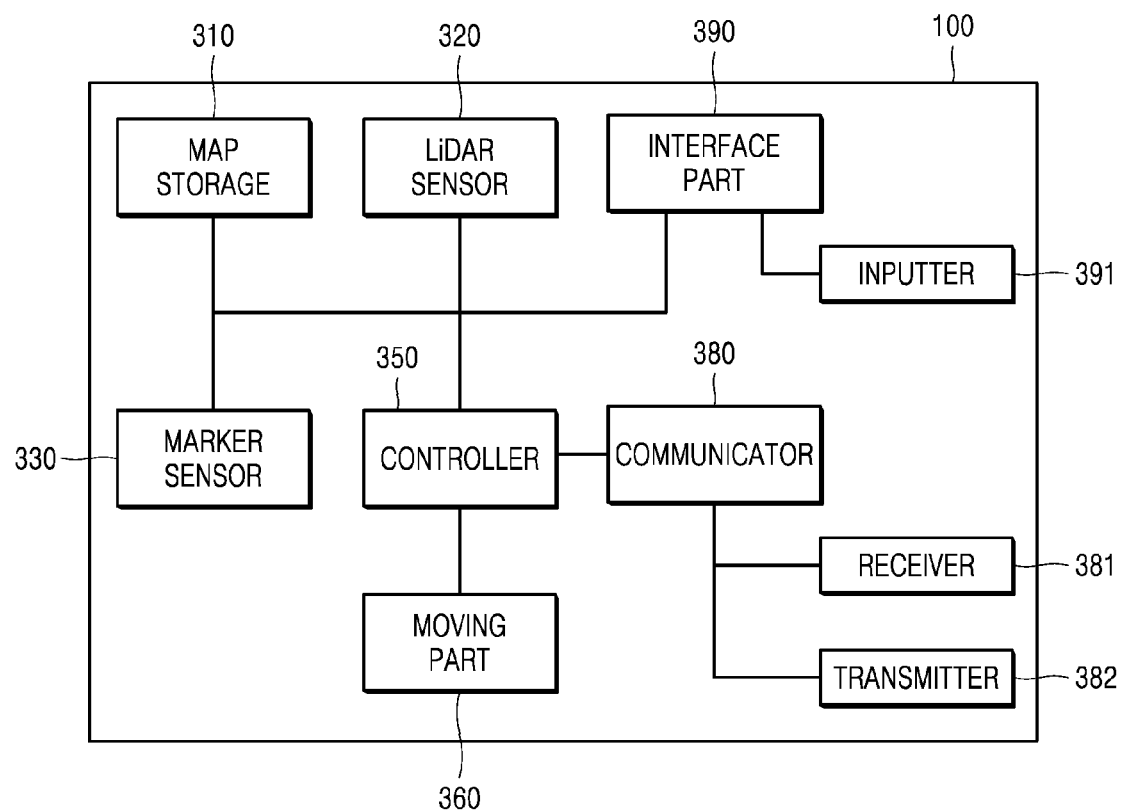
FIG. 8 is a diagram illustrating configuration of a robot according to an embodiment.

Meanwhile, the robot 100 may include an inputter (391 of FIG. 8). The customer or employee of the restaurant may instruct the robot 100 in a desired command through the inputter. For example, the inputter may be provided as a text input interface through which a customer or an employee may input by hand, or provided as a voice recognition interface through which a customer or an employee may input by voice.

The robot 100 may set a target table 10 among the plurality of tables 10 and generate a driving route according to the content input to the inputter or a call of the caller 200.

As described above, the robot 100 may go to a specific table 10 by a command through the inputter of the customer or the employee, in addition to the case where the customer calls through the caller 200.

Even at this time, as in the above-described case of the call through the caller 200 of the customer, the robot 100 may generate a map for autonomous driving to the target table 10, set the driving route on the map, and drive along the driving route.

The robot 100 may return from the table 10 to an original location, for example, a location close to the charging apparatus 20. Even in the case of return, the robot 100 may conduct the autonomous driving for return in a method similar to the above-described method.

That is, the robot 100 may receive the information on the locations of the caller 200 and the obstacle 30 from the plurality of callers 200, generate the map for autonomous driving for going to the original location based on the received information, generate the driving route on the map, and return to the original location along the driving route.

Figure 7:
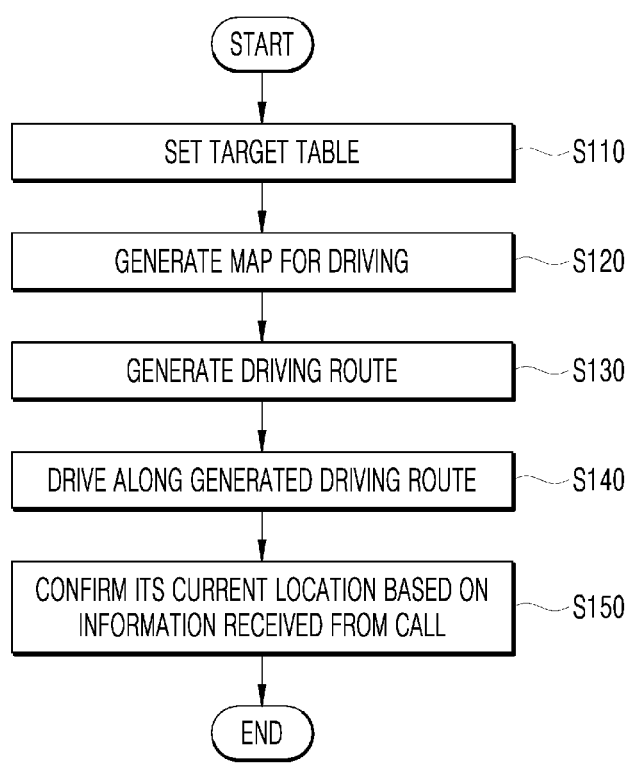
FIG. 7 is a flowchart illustrating an operation method of the serving system using the robot according to an embodiment.

FIG. 7 is a flowchart illustrating a method for operating the serving system using the robot 100 according to an embodiment. Hereinafter, a method for operating the serving system using the robot 100 will be described in detail. The content duplicative of the above description may be omitted.

The robot 100 may set a target table 10 among the plurality of tables 10 (operation S110). When receiving a call from the caller 200, the robot 100 may set the table 10 on which the calling specific caller 200 has been mounted as a target. When a command to go to the specific table 10 is input through an inputter provided by the robot 100, the robot 100 may set the input table 10 as a target.

As described above, the robot 100 may store the information on the location of each of the plurality of callers 200, the size and shape of each of the plurality of tables 10, the location of the caller 200 mounted on the table 10, and the rotational angle with respect to the baseline of the caller 200.

The plurality of callers 200 may confirm the information on the location of the obstacle 30 in a restaurant capable of disturbing the driving of the robot 100, and transmit the confirmed information to the robot 100. The robot 100 may store the information on the location of the obstacle 30.

The robot 100 may generate the map for driving based on the stored information (operation S120). The map may include the information on the location and size of the table 10, and the location and size of the obstacle 30.

The robot 100 may generate the driving route on the map (operation S130). At this time, the robot 100 may generate the location of the obstacle 30 on the map, and set the driving route so as to avoid the obstacle 30 when setting the driving route.

The robot 100 may drive along the generated driving route (operation S140). The caller 200 may transmit to the robot 100 the information on the distance from the caller 200 to the robot 100 and the direction of the robot 100 with respect to the caller 200 during driving of the robot 100.

While the robot 100 is driving, the robot 100 may confirm its current location based on the information received from the caller 200 provided in each of the plurality of tables 10 (operation S150).

The caller 200 may transmit to the robot 100 the information on the distance from the caller 200 to the obstacle 30 appearing on the driving route of the robot 100 and the direction of the obstacle 30 with respect to the caller 200. The robot 100 may store the information on the obstacle 30 received from the caller 200.

The robot 100 may perform the SLAM by confirming its current location during driving and confirming the features such as the table 10 and the obstacle 30 on the driving route based on the information received from the caller 200.

The robot 100 may confirm the changed arrangement of the table 10 by receiving the information on at least one of the change in the location of the caller 200 or the rotational angle with respect to the baseline from the caller 200.

The robot 100 may store the information on the changed arrangement of the table 10. The stored information may update the existing information stored by the robot 100. The robot 100 may generate a new map for autonomous driving based on the updated information, and generate a driving route based on the newly generated map.

After driving along the driving route to reach the target table 10, the robot 100 may perform the necessary task in the target table 10. After the task has been completed, the robot 100 may return to the original location again.

The method of returning to the original location is performed by a method for generating the map, generating the driving route on the map, and driving along the driving route by the robot 100, similar to the method in which the robot 100 moves from the original location to the target table 10.

FIG. 8 is a diagram illustrating configuration of a robot according to an embodiment. In one embodiment of the present disclosure, a robot 300 may confirm a location of tables 10 arranged outside by using a signal transmitted by the caller 200 and may generate a driving route. The controller 350 may control all components. The components of FIG. 8 may be configured as one processor. Particularly, a map storage 310, the controller 350, and a communicator 380 may be configured in one processor wherein division of FIG. 8 means logical division.

Also, the robot 100 may sense a distance with an outer object by using a LiDAR sensor 320 to avoid corrosion with the outer object during a moving process. The LiDAR sensor corresponds to one embodiment of a sensor arranged on the robot wherein various kinds of sensors such as an ultrasonic sensor, an infrared sensor, a laser sensor, and a Time of Flight (TOF) sensor etc. may be arranged on a robot. Therefore, a part noted as a LiDAR sensor in the present disclosure may be substituted for different sensors and these sensors may be also included in an embodiment presented in the present disclosure.

Also, a marker sensor 330 that confirms a marker arranged on a ceiling may include a camera. The controller 350 may control a shooting direction of the camera and the robot 100 controls the marker sensor 330 in a driving process to confirm the marker of the ceiling and an object of a driving direction.

The map storage 310 stores space in that the robot moves as a map. The map storage 310 may store location information of the table 10 and location information of the other robots within the space etc. Also, selectively, the robot may temporarily store location information of a dynamic obstacle in the map storage 310.

The map storage 310 stores locations of tables wherein if the locations are changed, changed locations of the tables are stored according to the controller 350. Also, information about initial locations of the tables is stored and if the controller 350 resets the map, the map storage 310 may restore the information about the initial locations of the tables.

A Light Detection And Ranging (LiDAR) sensor 320 may sense surrounding objects in two-dimension or three-dimension. In the case of a two-dimensional LiDAR sensor, a location of an object may be sensed in a range of 360° centering around the robot. LiDAR information sensed in a specific location may configure one LiDAR frame. That is, the LiDAR sensor 320 senses a distance between an object arranged outside the robot and the robot and generates the LiDAR frame.

The marker sensor 330 senses the marker arranged on the ceiling or placed above and confirms the current location of the robot. The locations of the markers are also stored in the map storage 310.

One embodiment of the marker sensor 330 may be directed to a camera. The marker sensor 330 of which one embodiment is directed to the camera may sense a marker arranged above of the robot such as the ceiling. And the controller 350 may rearrange the robot's position based on the marker sensed by the marker sensor 330.

In case that one embodiment of the marker sensor 330 is directed to the camera, the camera is located in the robot 100 to control a shooting direction. In a driving process, the robot may perform recognition of the marker and detection of the obstacle by alternately shooting the front direction and the upper direction.

A moving part 360 is a component moving the robot such as a kind of a wheel. The controller 350 may move the robot to control the moving part 360.

The robot 100 of the present disclosure may identify a location of tables and perform a specific function (guide, serving, and cleaning etc.) in a state in that one or a plurality of robots are located in service space. In this process, the robot 100 may store its location, and the robot 100 may confirm its current location in the overall space to generate a driving route required to move to a target point.

An interface part 390 may provide certain information to a user. Also, an inputter 391 configuring the interface part 390 receives information from the user. Various information such as a touch input and a voice input etc. is received from the user and a result thereof is output. Also, the interface part 390 may output a map that the robot 100 stores or may overlap a process in that the robot moves with the map to output a result thereof. That is, the interface part 390 may output information (for example, menu) needed by the user of the table or may receive an instruction from the user.

The communicator 380 may make the robot 1 communicate with the caller 200, the other robots or an external server to transmit and/or receive information.

The communicator 380 may be roughly divided into a receiver 381 and transmitter 382, but the above may be formed to be integrated.

The receiver 381 receives a signal from a plurality of callers arranged on a plurality of tables.

The controller 350 may use each table's identification information included in a signal received by the receiver 381 and information provided by the caller, identify any one or more locations of a plurality of tables, and generate a driving route.

The moving part 360 may provide information about rotation, speed, or direction etc. of the wheel generated in a moving process of the robot to the controller 350. The controller 350 may confirm a current location of the robot using other sensors or the map, and also may exactly calculate the current location of the robot by reflecting physical moving distance information provided from the moving part 360.

The controller 350 may generate a driving route of the robot using information stored in the map storage 310 and location information of the sensed obstacle etc. In this process, particularly, the controller 350 may use a camera that is directed to one embodiment of the marker sensor 330 to identify the dynamic obstacle.

Figure 9:
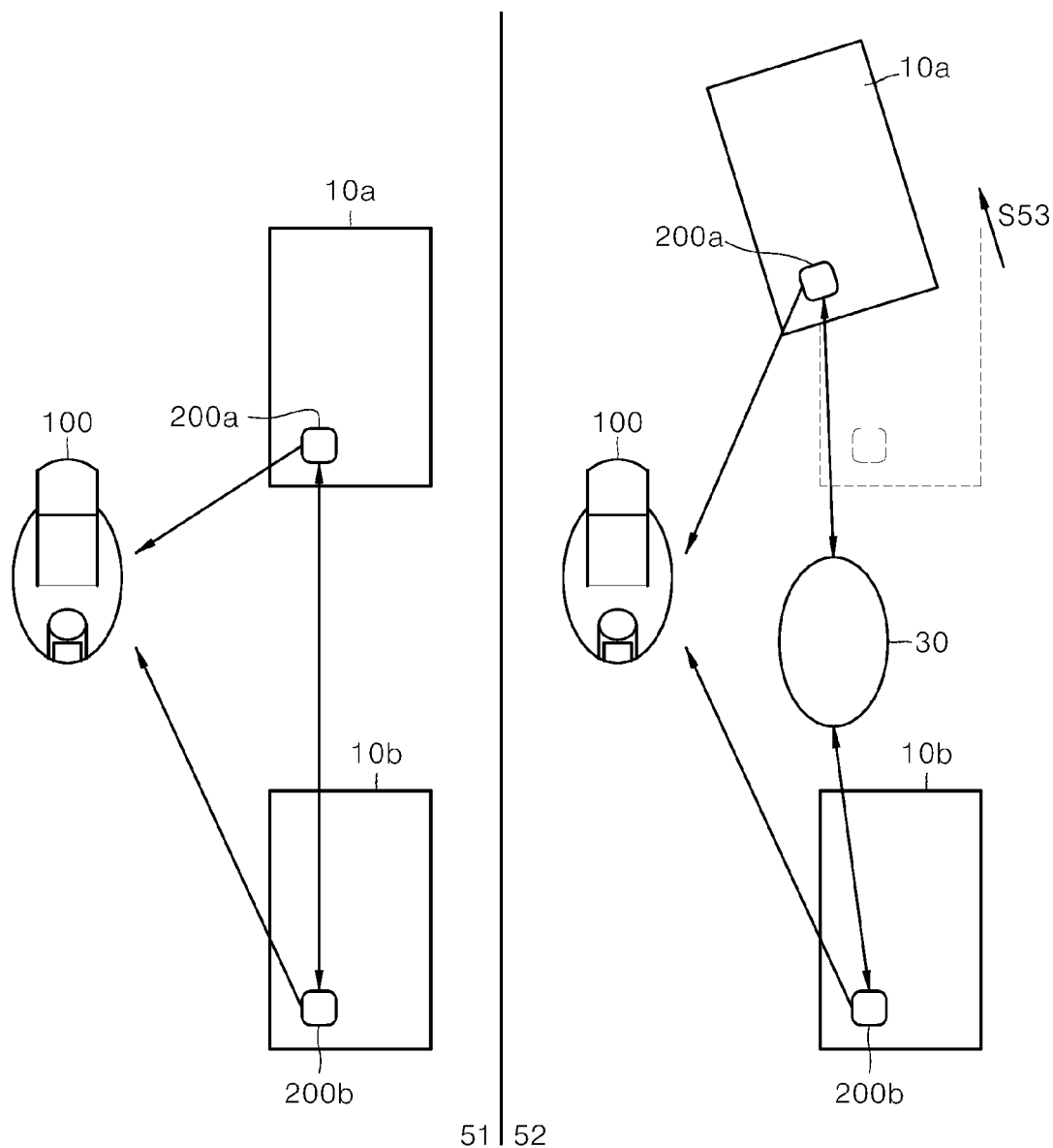
FIG. 9 is a diagram illustrating a process of confirming a move of a table and appearance of an obstacle according to an embodiment.

FIG. 9 is a diagram illustrating a process confirming the move of the table and appearance of the obstacle according to one embodiment.

Refer to 51. The robot 100 receives identification information from a first caller 200*a* and a second caller 200*b* that are respectively located in a first table 10*a* and a second table 10*b* at a first time point. In case that the one caller is located on one table, the identification information may be the same as that of the table. Also, the identification information received by the receiver 381 of the robot 100 may correspond to the identification information of one table in a ratio of 1:1. If two or more of callers are located on a table, the identification information of each caller is assigned wherein this identification information may correspond to the identification information of the table in a ratio of N:1. Here, if a plurality of callers are located on one table, the robot 100 may store location information in that each caller is located on the table.

Also, at the first time point, the robot 100 may receive distance information with the robot calculated by each of callers 200*a* and 200*b* from each of first and second callers 200*a* and 200*b*. Also, at the first time point, the robot 100 may receive direction information of the robot's location measured by each of first and second callers 200*a* and 200*b*.

Also, at the first time point, the robot 100 may receive location information (location of callers within space) of each of callers calculated by each of the first and second callers 200*a* and 200*b*.

Also, the robot 100 may receive a distance between each of first and second callers 200*a* and 200*b* at the first time point.

Also, the robot 100 may receive information about whether to rotate and a rotational angle of each of first and second callers 200*a* and 200*b* at the first time point.

The controller 350 of the robot 100 may calculate the location of the table in space using the received information and may generate the map shown in 51.

Meanwhile, in case that the table in that the first caller 200*a* is located moves after the first time point, the first caller 200*a* stores whether to rotate and a rotational angle of the table. Further, the robot 100 receives information from each of first and second callers 200*a* and 200*b* such as 52 at a second time point after the first time point.

The first caller 200*a* transmits information about whether there is rotation generated by that the table moves such as S53 or not and information related to the rotational angle to the robot 100. Also, the first caller 200a may transmit information about the location of the obstacle 30 arranged between the first caller 200a and the second caller 200b to the robot 100. Each of callers 200a and 200b may generate information about a distance from the caller to the obstacle and the direction of the obstacle with respect to the caller. Further, the controller 350 may use information about a location or a direction of the obstacle transmitted by the first caller 200a and the second caller 200b to confirm that one or two more obstacles are located.

Meanwhile, the second caller 200b may transmit information about the location of the obstacle 30 located between the first caller 200a and the second caller 200b to the robot 100.

The robot 100 may update or generate the map including an arrangement state of the table by reflecting the changed state of 52 based on the received information.

As one embodiment, the controller 350 may generate the map by combining coordinates of each caller, a size and a shape of the table, and a rotational angle with respect to a baseline of the caller based on the received information.

The second time point may correspond to a time point that is periodically repeated after the first time point. Each of callers may periodically confirm a moving state of the table and the obstacle and may transmit the above to the robot 100. As one embodiment, the receiver 381 of robot my receive information on at least one of a change in the location of the caller or the rotational angle with respect to the baseline from the first caller 200a, and the controller 350 may generate the map by updating table's changed state based on the received information.

Also, the second time point may correspond to the time point at which the robot 100 starts to move after the first time point. If the robot 100 starts to move, each of callers may be triggered and may transmit information such as 52 to the robot 100.

Also, the second time point may correspond to a time point in that a change occurs after the first time point. If each callers 200a, 200b detect the movement of table or obstacle, then transmits information to robot 100 in real time.

Also, at the second time point, in a process in that the caller transmits a calling signal to the robot 100, information about the changed state of the table and the obstacle confirmed by the caller may be also transmitted to the robot 100. In this case, if any one caller transmits a calling signal, the adjacent other callers may be triggered thereby and may transmit information to the robot 100 such as 52.

Figure 10:
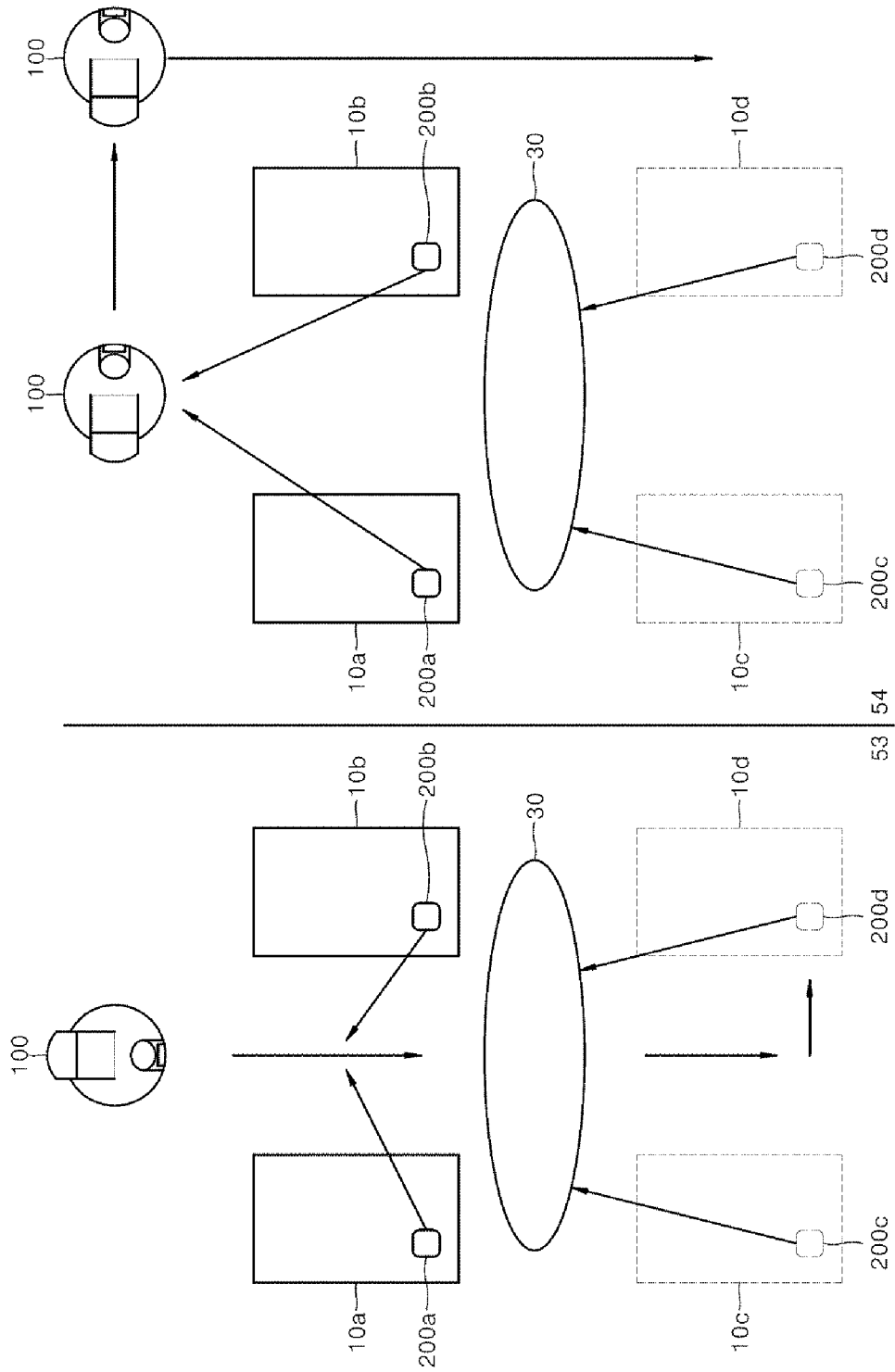
FIG. 10 is a diagram illustrating a process in that a robot confirms its current location according to an embodiment.

FIG. 10 relates to a diagram illustrating a process in that the robot confirms the current location according to one embodiment.

As reviewed in FIG. 9, the robot may confirm the current location of the robot based on the received information (for example, information about a distance to the robot and a direction of the robot with respect to the caller) from the caller in a state of stop or driving and may generate a driving route using the above.

Also, the robot 100 may change the driving route of the robot in case that the obstacle is located around some tables of the tables. In 53 of FIG. 10, the robot 100 receives a calling signal from a fourth caller 200d, generates the driving route and moves to the last stop (destination) of the table 10d on which the fourth caller 200d is located. In case of 53, robot 100 may move to the table 10a, 10b where first caller 200a and second caller 200b are disposed in, the controller 350 of the robot 100 may confirm that robot 100 cannot receive signal from the third caller 200c and fourth caller 200d. Because an obstacle 30 is located as 53, and the obstacle blocks the signal of the third caller 200c and fourth caller 200d.

Therefore, the receiver 381 of the robot 100 receives information from callers 200a and 200b located on two tables 10a and 10b of four tables. Thereafter, the controller 350 determines the obstacle is located around callers 200c and 200d of two tables 10c and 10d that fail to transmit information, so that the driving route of the robot is generated again such as 54.

Further, the robot 100 may travel along a route moving in a right direction and may receive information transmitted by the fourth caller 200d such as 54.

In summary, the receiver 381 of the robot 100 may receive information from the caller located in M smaller than N tables of N tables located in space. It means that the obstacle is located between the caller or surroundings of the caller located in some tables and the robot. Here, M represents the number of total tables located in the space and N represents the number of callers (and the number of tables) which may send information to the robot without blocking.

Therefore, after calculating locations of M tables of the callers to which information is transmitted, the controller 350 determines the obstacle is located around the caller of N-M tables (number of tables is N minus M) or the obstacle is located between the caller of the N-M tables and the robot. Thereafter, the controller 350 generates the driving route of the robot by reflecting this determination result (refer to 54).

Figure 11:
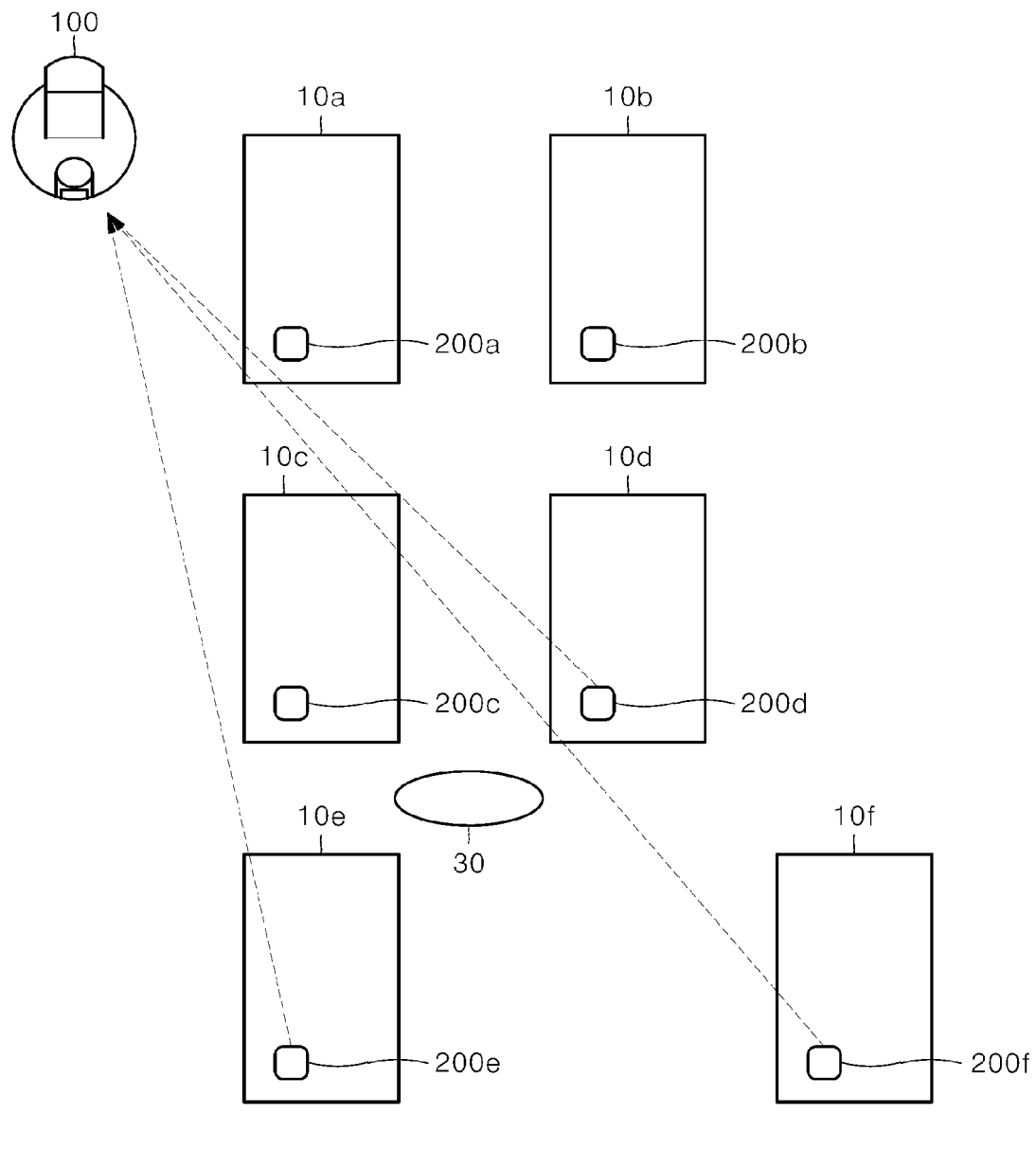
FIGS. 11 and 12 are diagrams illustrating a driving process in case that a plurality of callers are called according to an embodiment.
Figure 12:
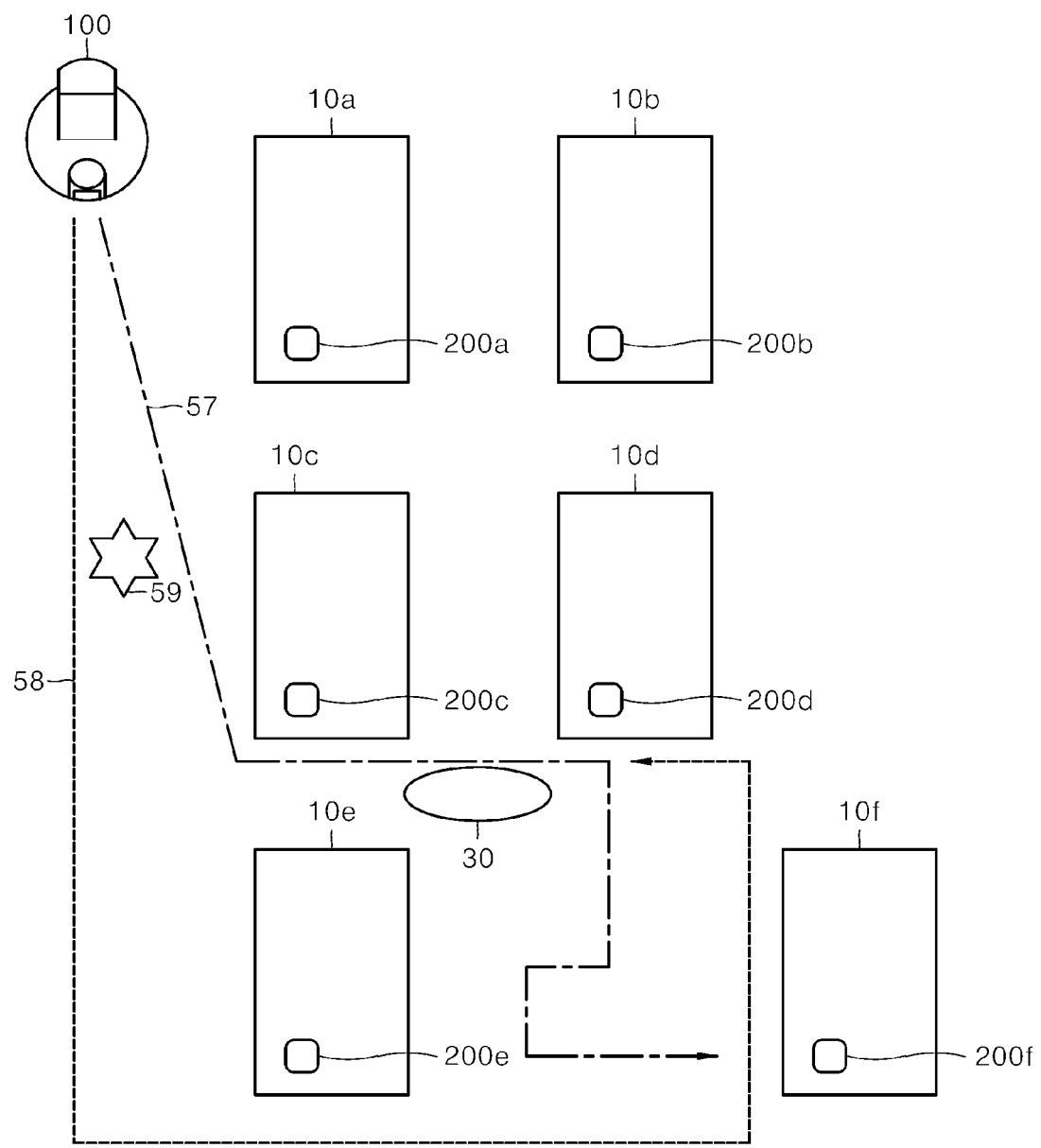

FIGS. 11 and 12 are diagrams illustrating a driving process in case that a plurality of callers are called according to an embodiment. The robot 100 receives a calling signal from callers 200d, 200e, and 200f located in three tables 10d, 10e, and 10f. Also, despite of being not shown in drawings, all the callers 200a, 200b, 200c, 200d, 200e, and 200f transmit the location of the table, the moving state of the table, or adjacent obstacle information etc. to the robot 100. The callers 200d, 200e, and 200f located in three tables 10d, 10e, and 10f may transmit the pre-described information together with the calling signal to the robot 100.

The controller 350 may set a table to be arrived in advance using the received calling signal, the obstacle information, and the information about the table location etc.

FIG. 12 shows the driving route generated by the controller.

If there is no obstacle 30, the controller 350 may generate the driving route 57 of moving to the fourth table 10d (the caller 200d is located), passing the fifth table 10e (the caller 200e is located), and directing to the destination of the sixth table 10f (the caller 200f is located).

However, the obstacle 30 is located in the driving route of 57, so that the controller 350 may generate the driving route 58 of moving to the fifth table 10e (the caller 200e is located), passing the sixth table 10f (the caller 200f is located) and then directing to the destination of the fourth table 10d.

Further, the robot 100 confirms if the obstacle 30 is still in a state of being located before arriving at the point 59 in a process of moving along the generated driving route 58. As one embodiment of a way of confirming, the controller 350 may confirm the current location of obstacles using the location information of the obstacle transmitted by each of callers until the robot 100 arrives at the point 59.

If there is no obstacle 30 at the point 59, the controller 350 controls the robot 100 to move along the driving route such as 57. At the point 59, if the obstacle 30 is confirmed in the driving route indicated as 57, the controller 350 may control the robot 100 to move along the driving route such as 58.

In summary, the receiver 381 of the robot 100 receives K calling signals from K callers located in K (K>1) tables. The controller 350 fixes the order of K tables by reflecting the location of the obstacle around these tables. And the controller 350 generate driving route based on the order. Here, K represents the number of tables such that K callers of each K table sends a calling signal to the robot.

Also, the robot may receive a calling signal from other tables (for example, table 10b that the caller 200b is located) other than K tables in a process of driving along the driving route indicated at 58. In this case, the controller 350 may generate a new driving route by reflecting a distance between the location of the second table 10b and the robot, and the distance between the driving route 58 and the second table 10b.

Figure 13:
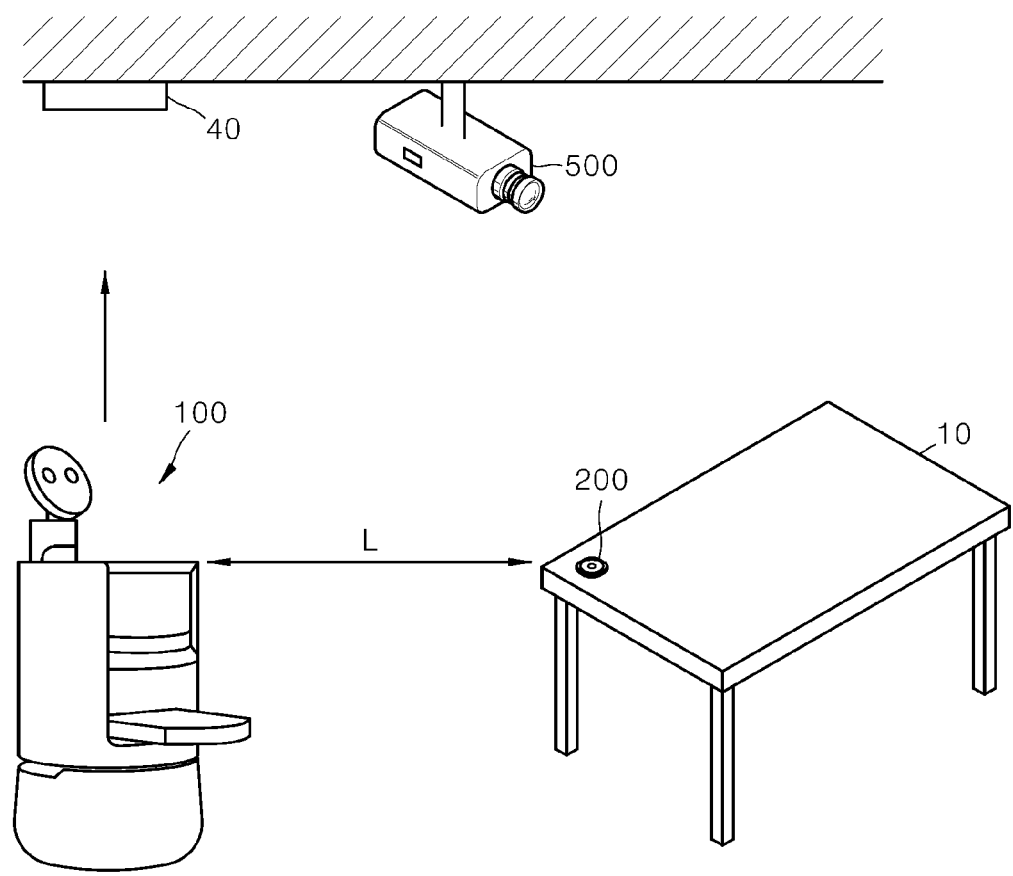
FIG. 13 is a diagram illustrating a process in that a robot confirms a marker according to an embodiment.

FIG. 13 is a diagram illustrating a process in that the robot identifies a marker according to one embodiment. As predescribed, the robot 100 further includes the marker sensor 330 sensing a marker located above. One embodiment of the marker sensor 330 may be directed to a camera.

The controller 350 of the robot 100 may generate a map based on information provided by the caller 200 of the table 10. Depending on information provided by the caller 200, the controller 350 may confirm a distance between the robot and the table 10 and a location of the table 10.

The marker sensor 330 senses (S60) a marker 40 located onto the ceiling in a process in that the robot 100 travels. A location of the marker 40 is the fixed location, so that the controller 350 readjusts the location of the robot with respect to the marker 40 sensed by the marker sensor 330. That is, before the marker 40 is sensed, the controller 350 stores that the robot is located in first location (x1, y1). However, after the marker is sensed, the controller 350 readjusts the location of the robot with respect to second location (x2, y2) that is the location of the marker 40.

Here, when a difference between the first location and the second location is in a range of an acceptable error or more, for example, any one or more of a size of |x1−x2| or a size of |y1−y2| may has a difference of a predetermined reference (for example, 30 cm) or more. In this case, the controller 350 may readjust the location of the table 10.

That is, the controller 350 may reset the location of the tables onto the map generated based on information provided by the callers by reflecting an error of the first location and the second location. For example, before sensing the marker, the controller 350 is in a state of storing that the location of the table 10 is located at (x3, y3) in the map.

Further, the condition in that x2−x1 is 35 cm and y2−y1 is 45 cm is assumed. The controller 350 confirms there is an error in the location of the previously stored table 10, and resets the location of the tables on the map wherein (x3+35, y3+45) is the location of the table 10.

Meanwhile, there may not be an error in the location of the table 10 in this process. Therefore, in order that the controller 350 of the robot 100 verifies the location of the table 10, L that is a distance between the robot 100 and the table 10 may be measured. For the above, the controller 350 may verify the location of the table 10 using the LiDAR sensor 320 or the camera.

Also, information transmitted by the caller 200 may be accumulatively stored and the controller 350 may verify the current location of the table 10 by comparing changes of distances between a distance in that the robot travels and the table 10.

Meanwhile, the camera 500 may be located onto the ceiling wherein this camera may shoot tables located in space. That is, a serving system may further include the camera.

Figure 14:
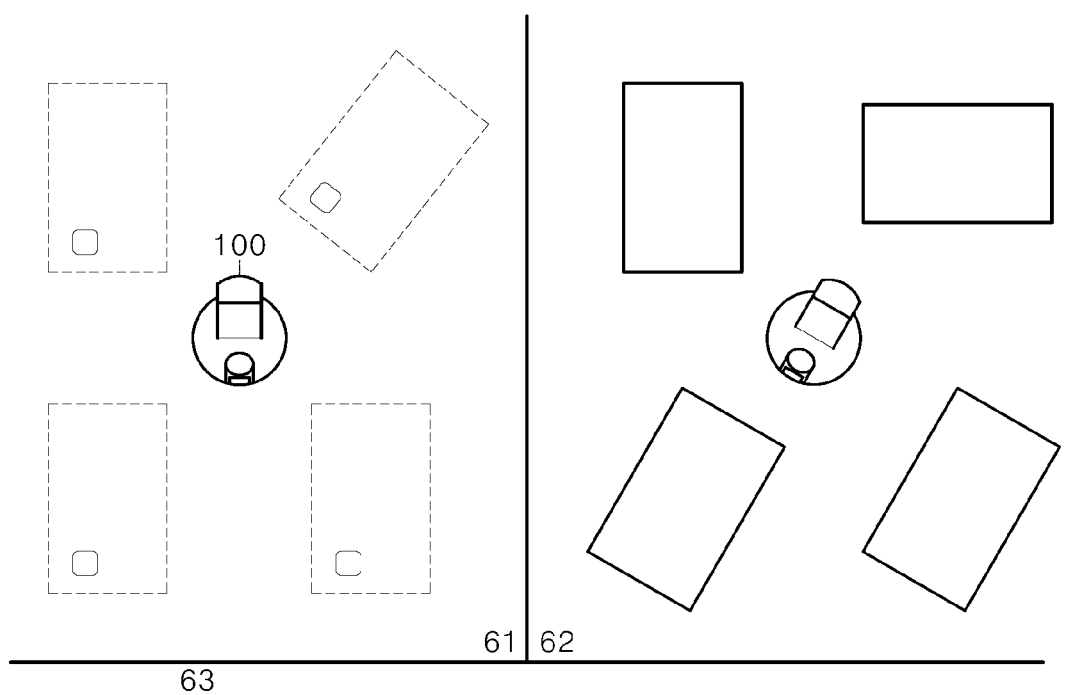
FIG. 14 is a diagram illustrating a process in that a robot obtains table arrangement information using a ceiling camera according to an embodiment.
Figure 14:
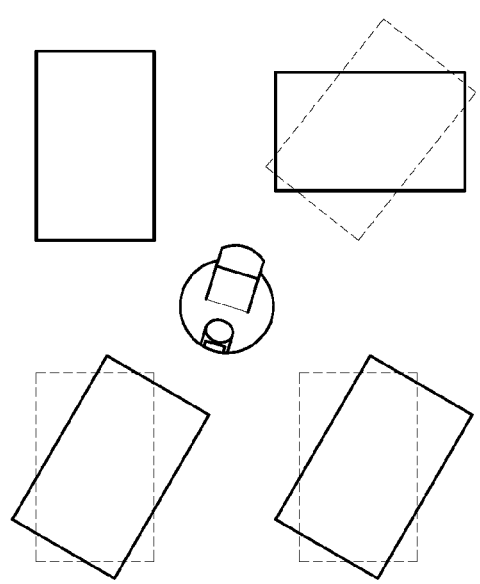

FIG. 14 is a diagram illustrating a process in that the robot obtains table arrangement information using a ceiling camera according to an embodiment.

The camera 500 reviewed in FIG. 13 may shoot tables within space. The serving system may transmit a shot outline of the tables to the robot. That is, the serving system may provide the location information of the tables obtained by shooting on the ceiling to the robot 100.

According to one embodiment, the robot 100 receives outline information of the tables such as 62 shot by the camera 500 in a state of storing information about the location of tables such as 61 of FIG. 14. Also, the robot 100 may be shot in a video. There is an difference such as 63 between the video 62 of the table shot by the camera 500 and the location 61 of the tables based on information provided by the callers.

Therefore, the receiver 381 receives table arrangement information shot by the camera 500 arranged onto the ceiling of space in that the table is located, and then the controller 350 stores the table arrangement information in the map and updates the current location of the robot based on the changed table arrangement information.

Figure 15:
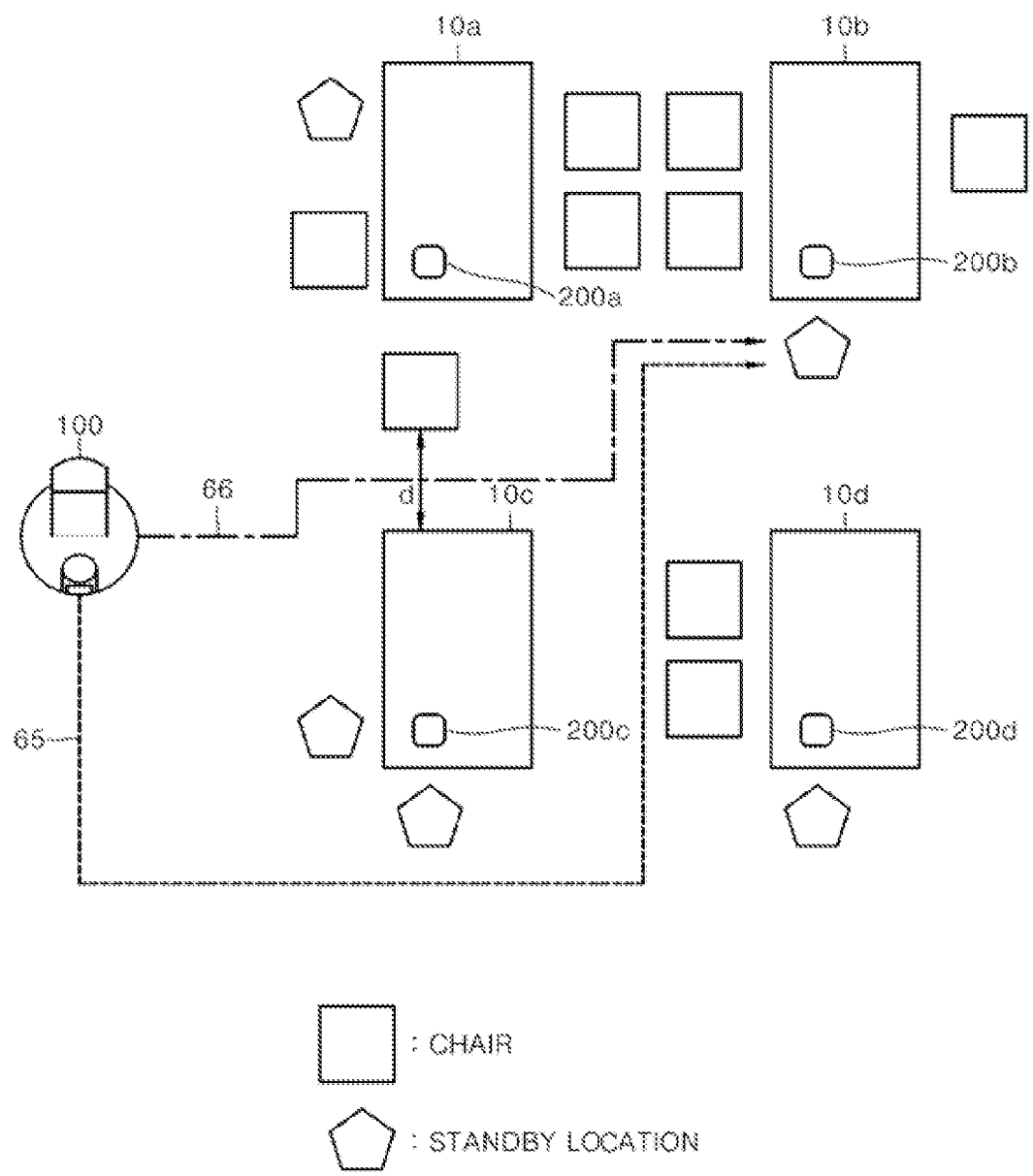
FIG. 15 is a diagram illustrating a process in that a robot modifies its driving depending on an interval of tables according to an embodiment.

FIG. 15 is a diagram illustrating a process in that a robot modifies its driving depending on an interval among tables according to an embodiment.

The robot may store physical characteristics of information about tables of the overall space. For example, the robot may store information about a size, a shape, and a direction of each table and may use the information in a driving process. For example, the robot may calculate a physical location and the interval of the table, and may generate a route according to whether the robot may pass among tables using the above or not.

As one embodiment, the robot may secure information of a person taking a seat around the relevant table or the location information taking a seat around the table upon calculating the interval of the table. In this case, if the robot may not travel since the interval among tables becomes narrow upon generating a route, the other driving route may be generated to respond against the above.

FIG. 15 shows a state in that a chair is located every table. Information about each table stored by the robot 100 includes location information of the chair located in each table. For example, locations of chairs located around each table may be confirmed in order that the robot 100 moves to the second table 10b. Thereafter, the robot 100 confirms that a distance between a chair located around the first table 10a and the third table 10c is "d." If this distance "d" is a gap that has a size which may not be passed by the robot, the robot may set a route of moving to the second table 10b such as 65.

On the contrary, if the distance "d" is the gap that has a size which may be passed by the robot, the robot may set a route of moving to the second table 10b such as 66.

Also, the robot 100 may determine a standby location in case of moving to each table. For example, if the robot 100 is set to stand by in the closest location to the caller located in each table, the robot may determine the standby location at a point which is adjacent to the caller and in which the chair is not located. Determination of the case in that a chair is located or determination about a region in that a person moves may be performed by the camera 500 of the ceiling or the robot 100.

For example, the LiDAR sensor 320 of the robot 100, an additional camera (not shown) mounted on the robot 100, or the camera 500 of the ceiling may confirm if a person exists in space, and then if it is determined that there is a person around the table, the standby location may be adjusted.

FIG. 15 relates to the standby location set by the robot every table. Originally, two standby locations that are adjacent to the caller 200c such as the third table 10c may be set every table.

However, in the case of the first table 10a, if the chair is located around the caller 200c or if it is determined that there is a person, the robot 100 may set other vacant space as the standby location.

If there is a chair or a person at any one standby location of two standby locations such as the second table 10b and the fourth table 10d, the robot 100 may set the other standby location.

In summary, the content is as follows. The robot 100 confirms people or chairs around tables by using the camera 500 of the ceiling or a sensor mounted on the robot 100 etc. Further, if driving of the robot is not possible due to these people or chairs, a new driving route is generated. In the same way, even though there are people or chairs in the standby position that is originally set, the robot 100 may reset a new standby location.

Figure 16:
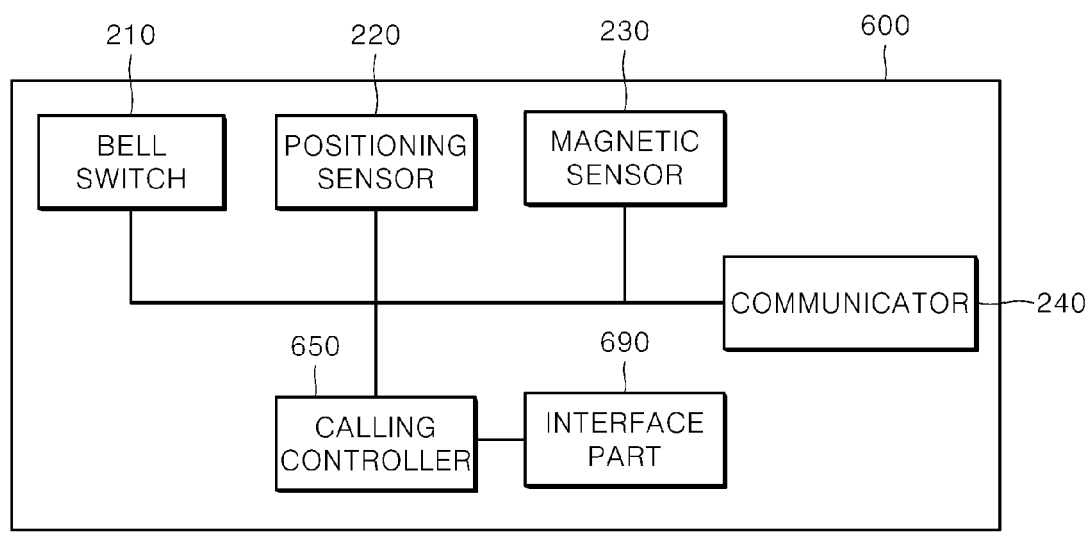
FIG. 16 is a diagram illustrating configuration of a table robot including a function of a caller according to an embodiment.

FIG. 16 is a diagram illustrating configuration of the table robot including a function of the caller according to one embodiment.

The table robot 600 may include a function of the caller 200 previously reviewed and also may communicate with people on the table. The table robot 600 may include a bell switch 210, a positioning sensor 220, and a magnetic sensor 230 of the caller previously reviewed. In addition, an interface part 690 that provides interaction of receiving an order of users on the table, or explaining a menu to users etc., and the calling controller 650 controlling theses components are further included.

Also, in this process, the user may input a voice, "Call a robot" through the interface part 690 without pressing the bell switch 210. In this case, the table robot 600 may transmit a calling signal to the robot 100.

Also, the interface part 690 of the table robot 600 includes components by which the user may perform voicing/touching etc. such as a mike, a speaker, a touch pad, and a camera etc. or may shoot the user. Further, the table robot 600 may confirm locations of people taking a seat around the table by using the interface part 690 and may transmit the above to the robot 100.

The table robot 600 of FIG. 16 may be located around each of tables wherein a function and configuration of the caller 200 previously reviewed may be included. Also, the table robot 600 may monitor information needed for driving of the robot 100, for example, locations of people around the tables or a state of taking a seat etc. and may provide the information to the robot 100. That is, the table robot 600 is located on the table to ease driving of the robot 100 by obtaining location information of a person or an obstacle around a table.

Also, the table robot 600 may perform work such as making an order or payment on the table wherein the work may be performed without moving of the robot 100.

Hereinafter, an AI device, an AI server, and an AI system related to an embodiment will be described.

Figure 17:
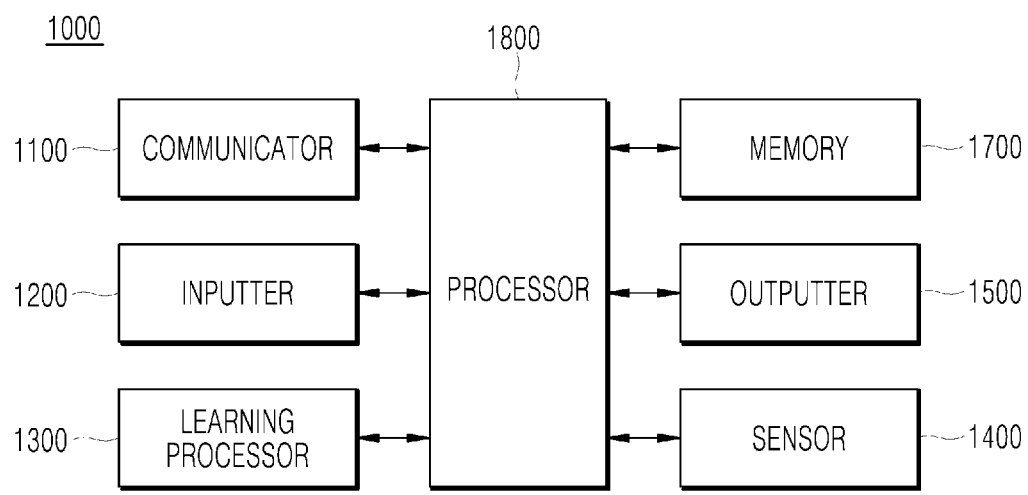
FIG. 17 is a diagram illustrating an AI device 1000 according to an embodiment.

FIG. 17 is a diagram illustrating an AI device 1000 according to an embodiment.

The AI device 1000 may be implemented by a fixed device or a movable device, etc., such as a TV, a projector, a mobile phone, a smartphone, a desktop computer, a notebook, a digital broadcasting terminal, a personal digital assistant (PDA), a portable multimedia player (PMP), a navigation, a tablet PC, a wearable device, and a set-top box (STB), a DMB receiver, a radio, a washing machine, a refrigerator, a desktop computer, a digital signage, a robot, or a vehicle.

Referring to FIG. 17, the terminal 1000 may include a communicator 1100, an inputter 1200, a learning processor 1300, a sensor 1400, an outputter 1500, a memory 1700, a processor 1800, etc.

The communicator 1100 may transmit and receive data with external devices such as the other AI devices 1000a to 1000e or an AI server 2000 by using wired or wireless communication technology. For example, the communicator 1100 may transmit or receive sensor data, a user input, a trained model, a control signal, and the like with the external devices.

In this case, the communications technology used by the communicator 1100 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The inputter 1200 may obtain various types of data.

The inputter 1200 may include a camera for inputting an image signal, a microphone for receiving an audio signal, and a user inputter for receiving information inputted from a user. Here, the signal obtained from the camera or the microphone may also be referred to as sensing data or sensor information by treating the camera or the microphone as a sensor.

The inputter 1200 may acquire various kinds of data, such as learning data for model learning and input data used when an output is acquired using a trained model. The inputter 1200 may also obtain raw input data, and in this case, the processor 1800 or the learning processor 1300 may extract an input feature as preprocessing for the input data.

The learning processor 1300 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 1300 may perform AI processing together with a learning processor 2400 of the AI server 2000.

The learning processor 1300 may include a memory which is combined or implemented in the AI device 1000. Alternatively, the learning processor 1300 may be implemented using the memory 1700, an external memory directly coupled to the AI device 1000, or a memory maintained in an external device.

The sensor 1400 may obtain at least one of internal information of the AI device 1000, surrounding environment information of the AI device 1000, and user information by using various sensors.

At this time, the sensor included in the sensor 1400 may include at least one of a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, a LiDAR, a radar, etc.

The outputter 1500 may generate an output related to visual, auditory, or tactile, etc.

At this time, the outputter 1500 may include a display unit for outputting visual information, a speaker for outputting auditory information, a haptic module for outputting tactile information, etc.

The memory 1700 may store data supporting various functions of the AI device 1000. For example, the memory 1700 may store input data, learning data, learning model, learning history, etc. obtained from the inputter 1200.

The processor 1800 may determine at least one executable operation of the AI device 1000 based on the information determined or generated by using a data analysis algorithm or a machine learning algorithm. In addition, the processor 1800 may perform the determined operation by controlling the components of the AI device 1000.

For this purpose, the processor 1800 may request, search, receive, or utilize data of the learning processor 1300 or the memory 1700, and control the components of the AI device 1000 so as to execute an operation predicted or an operation determined to be preferable among at least one executable operation.

At this time, when the external device needs to be connected to perform the determined operation, the processor 1800 may generate a control signal for controlling the corresponding external device, and transmit the generated control signal to the corresponding external device.

The processor 1800 may obtain intention information with respect to a user input, and determine the requirement of the user based on the obtained intention information.

At this time, the processor 1800 may obtain the intention information corresponding to the user input by using at least one of a Speech To Text (STT) engine for converting a speech input into a string or a Natural Language Processing (NLP) engine for obtaining the intention information of a natural language.

At this time, at least one of the STT engine or the NLP engine may be composed of an artificial neural network at least partially learned according to the machine learning algorithm. In addition, at least one of the STT engine or the NLP engine may be learned by the learning processor 1300, may be learned by the learning processor 2400 of the AI server 2000, or may be learned by distributed processing thereof.

The processor 1800 may store it in the memory 1700 or the learning processor 1300 by collecting history information including the operation content of the AI device 1000 or the user feedback on the operation, or transmit it to the external device such as the AI server 2000, etc. The collected history information may be used to update the learning model.

The processor 1800 may control at least some of the components of the AI device 1000 in order to drive an application program stored in the memory 1700. In addition, the processor 1800 may combine and operate two or more of the components included in the AI device 1000 in order to drive the application program.

Figure 18:
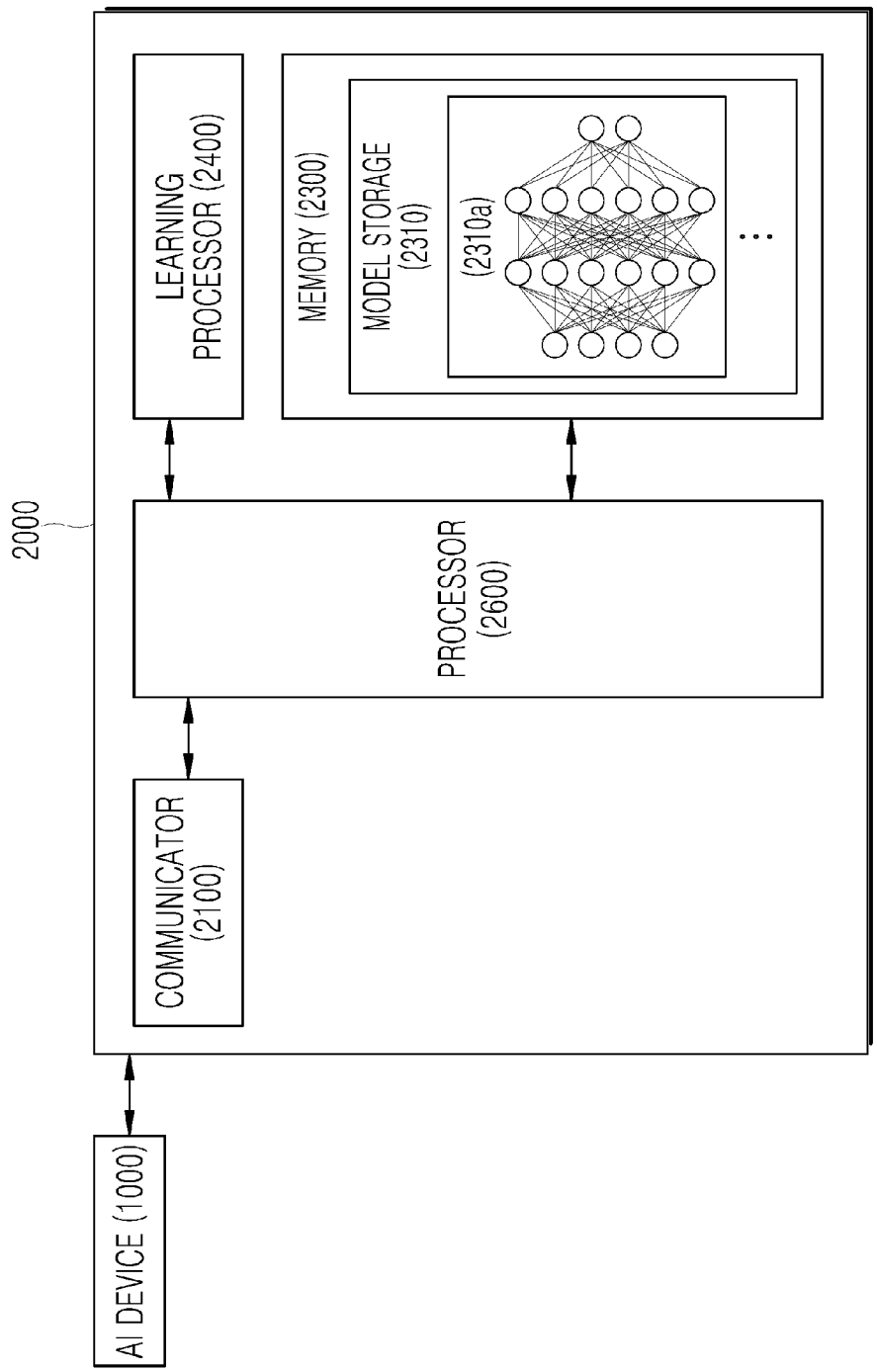
FIG. 18 is a diagram illustrating an AI server 2000 according to an embodiment.

FIG. 18 is a diagram illustrating an AI server 2000 according to an embodiment.

Referring to FIG. 18, the AI server 2000 may refer to a device for learning an artificial neural network by using the machine learning algorithm or using the learned artificial neural network. Here, the AI server 2000 may include a plurality of servers to perform distributed processing, and may be defined as a 5G network. In this case, the AI server 2000 may be included as a configuration of a portion of the AI device 1000, and may thus perform at least a portion of the AI processing together.

The AI server 2000 may include a communicator 2100, a memory 2300, a learning processor 2400, a processor 2600, etc.

The communicator 2100 may transmit and receive data with an external device such as the AI device 1000.

The memory 2300 may include a model storage 2310. The model storage 2310 may store a model being learned or learned (or artificial neural network 2310*a*) through the learning processor 2400.

The learning processor 2400 may learn the artificial neural network 2310*a* by using the learning data. The learning model may be used in a state where the model is mounted in the AI server 2000 of the artificial neural network, or used in a state where the model is mounted in an external device such as the AI device 1000.

The learning model may be implemented in hardware, software or a combination of hardware and software. When some or all of the learning models are implemented in software, one or more instructions constituting the learning model may be stored in the memory 2300.

The processor 2600 may infer a result value with respect to the new input data by using the learning model, and generate a response or control command based on the inferred result value.

FIG. 19 is a diagram illustrating an AI system 1 according to an embodiment.

Referring to FIG. 19, the AI system 1 may have at least one among the AI server 2000, a robot 1000*a*, an autonomous driving vehicle 1000*b*, an XR device 1000*c*, a smartphone 1000*d*, or a home appliance 1000*e* connected with a cloud network 10. Here, the robot 1000*a*, the autonomous driving vehicle 1000*b*, the XR device 1000*c*, the smartphone 1000*d*, or the home appliance 1000*e*, to which the AI technology has been applied, may be referred to as the AI devices 1000*a* to 1000*e*.

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (1000*a* to 1000*e*, 2000) constituting the AI system 1 may be connected to each other through the cloud network 10. In particular, each individual device (1000*a* to 1000*e*, 2000) may communicate with each other through the base station but may communicate directly to each other without relying on the base station.

The AI server 2000 may include a server performing AI processing and a server performing computations on big data.

The AI server 2000 may be connected with at least one among the robot 1000*a*, the autonomous driving vehicle 1000*b*, the XR device 1000*c*, the smartphone 1000*d*, or the home appliance 1000*e* that are the AI devices constituting the AI system 1 through the cloud network 10, and at least partially assist the AI processing of the connected AI devices 1000*a* to 1000*e*.

At this time, the AI server 2000 may learn the artificial neural network according to the machine learning algorithm on behalf of the AI devices 1000*a* to 1000*e*, and directly store the learning model or transmit the learning model to the AI devices 1000*a* to 1000*e*.

At this time, the AI server 2000 may receive input data from the AI device 1000*a* to 1000*e*, infer a result value from the received input data by using the learning model, generate a response or control command based on the inferred result value, and transmit the generated response or control command to the AI device 1000a to 1000e.

Similarly, the AI device 1000a to 1000e may infer a result value from the input data by employing the learning model directly and generate a response or control command based on the inferred result value.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semi-conductor recording devices. Additionally, the computer program that embodies the embodiments includes a program module that is transmitted in real time through an external device.

Although only some embodiments were described above, other various embodiments may be possible. The technical contents of the embodiments described above may be combined in various methods unless they are not compatible, therefore new embodiments may be achieved. The embodiments of the present disclosure have been described. However, the embodiments may be changed and modified in different forms by one having ordinary skill in the art. Thus, it should be understood that the changes and modifications are also included within the scope of the present disclosure.

What is claimed is:

1. A robot, comprising:
a receiver configured to receive signals from a plurality of callers each respectively arranged on a plurality of tables in a space;
a marker sensor determining a marker that is placed in a fixed location in the space; and
a controller configured to:
identify locations of the plurality of tables by using identification information included in at least one received signal and information provided by at least one caller among the plurality of callers, wherein the information provided includes a distance from a respective caller to the robot and a direction of the robot with respect to the respective caller; and
generate a driving route for going to a target table with respect to a current location of the robot, wherein the generated driving route is based at least in part on the at least one received signal and the information provided by the at least one caller, wherein the controller is further configured to:
adjust, in a memory, a current location of the robot with respect to a second location based at least in part on a difference between a first location and the second location satisfying a threshold, wherein the first location corresponds to the current location of the robot before determining the marker and the second location corresponds to a current location of the marker after determining the marker, and
adjust, in the memory, locations of the plurality of tables on a map generated based at least in part on the information provided by the plurality of callers according to analyzing an error between the first location and the second location.

2. The robot of claim 1, wherein the space includes M tables with N callers and an obstacle, wherein M represents a number of total tables located in the space and N represents a number of callers capable of sending signals to the robot, and
the controller is further configured to:
determine, after determining locations of the M tables, whether the obstacle is arranged around a specific caller from among the N callers or the obstacle is arranged between the specific caller and the robot; and
generate an updated driving route of the robot based at least in part on the determination.

3. The robot of claim 1, wherein generating the driving route comprises:
receiving at least K signals from the plurality of callers arranged on K tables, wherein the at least K signals contain a location of the table of each caller, a moving state of the table of each caller, or adjacent obstacle information around the table of each caller; and
determining an arrangement of the K tables based on a location of obstacles around the K tables.

4. The robot of claim 3, wherein the receiver is further configured to receive an additional calling signal from an additional caller while the robot travels along the generated driving route, wherein the additional caller is located on an additional table that does not belong to the K tables, and the controller is further configured to generate an updated driving route based on a first distance between the additional table and the robot and a second distance between the generated driving route and the additional table.

5. The robot of claim 1, wherein the receiver is further configured to receive table arrangement information captured by a camera, wherein the table arrangement information includes at least location information of the plurality of tables, and the controller is further configured to store the received table arrangement information in a map, wherein the current location of the robot is further readjusted based on the received table arrangement information.

6. The robot of claim 1, wherein the robot comprises an input interface, and the controller is further configured to set a table to be targeted from among the plurality of tables based at least in part on content input from the input interface or the received signal from the plurality of callers, wherein the driving route is generated such that the robot goes to the table to be targeted.

7. The robot of claim 1, wherein the plurality of callers are each associated with respective table robots arranged on the plurality of tables, wherein the respective table robots obtain location information of a person or an obstacle around the plurality of tables.

8. A robot, comprising:
a receiver configured to receive signals from a plurality of callers each respectively arranged on a plurality of tables in a space; and
a controller configured to:
identify locations of the plurality of tables by using identification information included in at least one received signal and information provided by at least one caller among the plurality of callers, wherein the information provided includes a distance from a respective caller to the robot and a direction of the robot with respect to the respective caller; and generate a driving route for going to a target table with respect to a current location of the robot, wherein the generated driving route is based at least in part on the at least one received signal and the information provided by the at least one caller;

wherein generating the driving route comprises:

receiving at least K signals from the plurality of callers arranged on K tables, wherein the K signals contain a location of the table of each caller, a moving state of the table of each caller, or adjacent obstacle information around the table of each caller; and determining an arrangement of the K tables based on a location of obstacles around the K tables.

9. The robot of claim 8, wherein the space includes M tables with N callers and an obstacle, wherein M represents a number of total tables located in the space and N represents a number of callers capable of sending signals to the robot, and the controller is further configured to:

determine, after determining locations of the M tables, whether the obstacle is arranged around a specific caller from among the N callers or the obstacle is arranged between the specific caller and the robot; and generate an updated driving route of the robot based at least in part on the determination.

10. The robot of claim 8, wherein the receiver is further configured to receive an additional calling signal from an additional caller while the robot travels along the generated driving route, wherein the additional caller is located on an additional table that does not belong to the K tables, and the controller is further configured to generate an updated driving route based on a first distance between the additional table and the robot and a second distance between the generated driving route and the additional table.

11. The robot of claim 8, wherein the robot further comprises a marker sensor determining a marker that is placed in a fixed location in the space, and the controller is further configured to readjust the current location of the robot with respect to the determined marker.

12. The robot of claim 11, wherein the controller is further configured to:

readjust, in a memory, a current location of the robot with respect to a second location based at least in part on a difference between a first location and the second location satisfying a threshold, wherein the first location corresponds to the current location of the robot before determining the marker and the second location corresponds to a current location of the marker after determining the marker, and readjust, in the memory, locations of the plurality of tables on a map generated based at least in part on the information provided by the plurality of callers based at least in part on analyzing an error between the first location and the second location.

13. The robot of claim 11, wherein the receiver is further configured to receive table arrangement information captured by a camera, wherein the table arrangement information includes at least location information of the plurality of tables, and the controller is further configured to store the received table arrangement information in a map, wherein the current location of the robot is further readjusted based on the received table arrangement information.

14. The robot of claim 8, wherein the robot comprises an input interface, and the controller is further configured to set a table to be targeted from among the plurality of tables based at least in part on content input from the input interface or the received signal from the plurality of callers, wherein the driving route is generated such that the robot goes to the table to be targeted.

15. The robot of claim 8, wherein the plurality of callers are each associated with respective table robots arranged on the plurality of tables, wherein the respective table robots obtain location information of a person or an obstacle around the plurality of tables.

* * * * *